(12) United States Patent
Hayashi et al.

(10) Patent No.: US 8,556,615 B2
(45) Date of Patent: Oct. 15, 2013

(54) DIE FOR FORMING HONEYCOMB STRUCTURE AND MANUFACTURING METHOD OF THE SAME

(75) Inventors: Seiichiro Hayashi, Nagoya (JP); Tomoki Nagae, Nagoya (JP); Masanari Iwade, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 705 days.

(21) Appl. No.: 12/731,460

(22) Filed: Mar. 25, 2010

(65) Prior Publication Data
US 2010/0244309 A1    Sep. 30, 2010

(30) Foreign Application Priority Data
Mar. 27, 2009   (JP) .................................. 2009-079151

(51) Int. Cl.
    *B29C 47/12*    (2006.01)
(52) U.S. Cl.
    USPC ............... 425/380; 219/69.17; 264/177.12; 425/461; 425/467
(58) Field of Classification Search
    USPC ............ 425/380, 461, 464, 467; 264/177.12; 219/69.17
    See application file for complete search history.

(56) References Cited

U.S. PATENT DOCUMENTS

| | | | |
|---|---|---|---|
| 4,349,329 A * | 9/1982 | Naito et al. | 425/461 |
| 6,641,385 B2 * | 11/2003 | Fujita et al. | 425/380 |
| 7,163,389 B2 * | 1/2007 | Miyazaki et al. | 425/380 |
| 2003/0064126 A1 | 4/2003 | Miyazaki et al. | |
| 2007/0026188 A1 * | 2/2007 | Bookbinder et al. | 428/73 |
| 2010/0052205 A1 | 3/2010 | Brew et al. | |
| 2010/0116427 A1 * | 5/2010 | Shindo et al. | 156/244.13 |

FOREIGN PATENT DOCUMENTS

| | | |
|---|---|---|
| EP | 0 854 123 A1 | 7/1998 |
| EP | 2 153 958 A1 | 2/2010 |
| JP | 04-74131 B | 11/1992 |
| JP | 04-74132 B | 11/1992 |
| JP | 2003-094415 A | 4/2003 |
| WO | WO 2008/143028 | * 11/2008 |

OTHER PUBLICATIONS

Extended European Search Report dated Apr. 5, 2012.

* cited by examiner

*Primary Examiner* — Yogendra Gupta
*Assistant Examiner* — Joseph Leyson
(74) *Attorney, Agent, or Firm* — Burr & Brown

(57) ABSTRACT

A die for forming a honeycomb structure, comprising a platy die base member having a clay supply face on back surface thereof and including a plurality of introduction holes for introducing a mixed raw material for forming; and a clay forming face on upper surface including a plurality of slits for extrusion of the material being connected to the introduction holes and formed lattice-like partition regions; at least a part of lattice-like partition regions being provided in such a position that the extended line of at least part of a plurality of lattice-like regions overlap with the slits at edges thereof as top view, slits including inner peripheral slits formed in the inner peripheral region, and outer peripheral slits formed in the outer peripheral region surrounding the inner peripheral region and having a width-enlarged portion having a width larger than that of the inner peripheral slit, and production method thereof.

12 Claims, 15 Drawing Sheets

DIE FOR FORMING HONEYCOMB STRUCTURE AND MANUFACTURING METHOD OF THE SAME

BACKGROUND OF THE INVENTION

1. Field of the Invention

The present invention relates to a die usable for forming a honeycomb structure of high isostatic strength and a high precision, and being comprised of a plurality of cells defined by partition walls, and a manufacturing method of the die. More particularly, it relates to a honeycomb structure forming die usable for forming a honeycomb structure having a high isostatic strength and being comprised of cells having a pentangular shape or a more polygonal shape such as a hexagonal shape, a combination of cells having different sectional shapes, cells having different dimensions of from large to small cells in dimension or the like and in which partition walls of the cells on the outer peripheral side of the honeycomb structure are formed to be thicker than those of the cells in the center thereof, and a manufacturing method of the die.

2. Description of the Related Art

Heretofore, as a catalyst for purifying an automobile exhaust gas, a so-called honeycomb catalyst has been formed in which catalyst components are loaded on the surfaces of cells of a ceramic honeycomb carrier (a honeycomb structure), and such a structure that the honeycomb carrier has been held along an axial direction thereof because of a higher strength of the structure along the axial direction than that along its sectional (diametric) direction. In this case, to prevent the breakdown of the honeycomb carrier having been held along the axial direction thereof around the outer peripheral portion thereof, the cell partition walls (ribs) of the outer peripheral portion are formed to be thicker than inner partition walls, whereby the pressure withstanding strength of the honeycomb carrier along the axial direction is increased.

However, in recent years, because of demand for the decrease of the pressure loss of the exhaust gas in the honeycomb catalyst involving the orientation for the high output of an engine or demand for the effective utilization of the whole catalyst carrier to cope with the tightening of regulations on the exhaust gas, instead of the structure wherein the honeycomb catalyst carrier is held along the axial direction, a structure wherein the outer peripheral surface of the honeycomb catalyst carrier has been mainly held has started to be employed. One of reasons for the employment of the structure is that the tightening of the regulations on the exhaust gas causes the increase of the volume of the catalyst and the increase of the mass of the catalyst, and the structure wherein the catalyst carrier is held along the axial direction has such a small holding area that the catalyst structure cannot sufficiently be held against the vibration of the engine.

On the other hand, to improve the purification performance of the catalyst, there has been started a movement for decreasing the thicknesses of the cell partition walls of the honeycomb carrier to decrease the weight of the honeycomb carrier, thereby decreasing the heat capacity of the catalyst to improve warm-up characteristics in the purification performance. Furthermore, the decrease of the thicknesses of the walls also noticeably contributes to the decrease of the pressure loss.

Consequently, owing to the decrease of the thicknesses of the cell partition walls, the breakdown strength of the honeycomb carrier against an external pressure applied from the outer peripheral surface thereof tends to further lower. Furthermore, owing to the recent tightening of the regulations on the exhaust gas, the improvement of the burning conditions of the engine and the improvement of the purification performance of the catalyst are aimed, and the temperature of the exhaust gas rises yearly, whereby a resistance to thermal shock is strongly required for the honeycomb carrier. In this way, the thicknesses of the cell partition walls are decreased, the structure wherein the outer peripheral surface of the honeycomb carrier is held is employed, and resultantly the temperature of the exhaust gas rises. For these and other reasons, the setting of the thicknesses of the cell partition walls and a honeycomb outer wall, the increase of the isostatic strength of the honeycomb structure and the increase of the precision of an outer shape or a partition wall shape have become major themes.

As the honeycomb carrier having high isostatic strength and a highly precise structure shape, there is proposed a carrier having a structure in which only an outer peripheral rib is thickened and strengthened as compared with an inner peripheral rib. A die for extrusion-forming the honeycomb carrier is provided with a structure in which an outer peripheral slit is formed, by grinding, into a large slit as compared with an inner peripheral slit so as to increase the thickness of the outer peripheral rib as compared with the inner peripheral rib (see Patent Document 1).

As a manufacturing method of a ceramic honeycomb structure having hexagonal lattice-like cells, the combination of cells having different sectional shapes or cells having different dimensions of from large to small cells in dimension, heretofore an extrusion-forming method using such a die for forming the honeycomb structure that a die includes a die base member provided with back holes (hereinafter referred to as the introduction hole sometimes) through which a ceramic forming material (hereinafter referred to as the clay sometimes) is introduced, and hexagonal lattice-like slits connected to the back holes has been known. For example, the hexagonal lattice-like die is usually provided with hexagonal slits having widths corresponding to the thicknesses of partition walls of the honeycomb structure in one end face of the die base member, and the back holes connected to the slits and having large opening areas in the opposite end face thereof (the other end face). Moreover, the back holes are usually provided at positions where hexagonal slits intersect with one another, and are connected to the slits in the die base member. Therefore, a forming material such as a ceramic material introduced through the back holes is moved from the back holes having comparatively large inner diameters to the slits having small widths, and is extruded through the open frontal areas of the slits to form a formed article of the honeycomb structure (the formed honeycomb article).

As the manufacturing method of the die for forming the honeycomb structure having such hexagonal lattice-like cells, a manufacturing method is disclosed in which the above slits having a honeycomb shape are formed by electric discharge machining (EDM) (e.g., see Patent Documents 2, 3).

According to the manufacturing method of a honeycomb die disclosed in Patent Documents 2 and 3, the manufacturing method of the honeycomb die for manufacturing a honeycomb article having hexagonal lattice-like cells is described. The honeycomb structure including such hexagonal lattice-like cells has low shape retention ability during extrusion-forming and easily causes the deformation of the cell lattice as compared with a honeycomb structure having quadrangular cells, whereby it has been difficult to increase the isostatic strength.

Moreover, in a catalyst carrier using a catalytic function in an internal combustion engine, a boiler, a chemical reaction apparatus, a reformer for a fuel cell or the like, a filter for collecting fine particles, especially diesel fine particles in the exhaust gas (hereinafter referred to as the diesel particulate filter (DPF) sometimes) or the like, heretofore, the honeycomb structure made of a ceramic material has been used.

The honeycomb structure having been used for such a purpose usually includes a plurality of cells defined by porous partition walls as through channels for a fluid. Especially, in a case where the honeycomb structure is used as a fine particle collecting filter, the honeycomb structure has a structure in which adjacent cells are plugged at opposite ends alternately so as to form a checkered pattern at both end faces. In the honeycomb structure having such a structure, the fluid to be treated flows into each cell having an inflow side end face which is not plugged, that is, the cell having an outflow side end face plugged, passes through each porous partition wall, and is discharged from the adjacent cell, that is, the cell having the inflow side end face plugged and the outflow side end face which is not plugged. In this case, the partition walls function as the filter. When the honeycomb structure is used as a DPF, a particulate matter (hereinafter referred to as "the PM" sometimes) such as soot discharged from a diesel engine is collected by, and accumulated on the partition walls.

Furthermore, as the honeycomb structure to be used as such a DPF, a plugged honeycomb structure is known in which the sizes of cell open frontal areas in one end face are different from those in the other end face. This plugged honeycomb structure having the sizes of the cell open frontal areas in the one end face which are different from those in the other end face thereof is a plugged honeycomb structure including the combination of the cells having different sectional shapes or the cells having large and small dimensions, and the sizes (areas) of the inflow side cell open frontal areas are set to be larger than those (areas) of the outflow side cell open frontal areas, to improve a PM collecting efficiency. Specific examples of the cells in which the sizes of the cell open frontal areas in the one end face are different from those in the other end face include the combination of quadrangular cells having large and small dimensions, and the combination of quadrangular and octagonal cells.

[Patent Document 1] JP-A-2003-94415
[Patent Document 2] JP Patent No. 1784822 (JP-B-04-74131)
[Patent Document 3] JP Patent No. 1784823 (JP-B-04-74132)

However, in a die for forming the honeycomb structure described in Patent Document 1, the slits are realized by grinding with a disc grindstone, and this manufacturing method cannot be applied to the honeycomb structure including the pentangular lattice-like cells or more polygonal lattice-like cells such as hexagonal lattice-like cells, the plugged honeycomb structure in which the sizes of cell open frontal areas in the one end face are different from those in the other end face or the like. Hereinafter, the method will be described with reference to, for example, a plan view of the other end face of the die base member provided with slits 5 seen from a thickness direction 201 of the die base member. FIGS. 10A to 10D show several pattern examples of the lattice-like slits 5 of the die for forming the honeycomb structure. In FIGS. 10A to 10D, at least a part of a plurality of lattice-like partition regions 3 defined by the slits 5 is provided in such a position that the slits 5 overlap along the extended line of the edges of lattice-like regions in the plan view seen from the thickness direction 201 of the die base member, and hence the die cannot precisely be manufactured by the grinding with the disc grindstone or the like.

In a honeycomb structure forming die including a hexagonal lattice-like slits 5 as shown in FIG. 10A, the slits are provided in such a position that the slits 5 overlaps with the extended line along the edges of hexagonal lattice as shown by a one-dot chain line, and hence the die cannot precisely be manufactured by the grinding with the disc grindstone or the like.

Moreover, in a die for forming a plugged honeycomb structure in which the sizes of the cell open frontal areas in the one end face are different from those in the other end face, the die including lattice-like slits 5 having been composed of different dimensions of large and small sizes as shown in FIG. 10B, or in honeycomb structure forming dies including lattice-like slits having a pentangular shape or a more polygonal shape as shown in FIGS. 10C, 10D, a part of partition regions is provided so as to overlap with the extended line of the slits 5 along the edges of the lattice-like regions as shown by a one-dot chain line, and hence the die cannot precisely be manufactured by the grinding with the disc grindstone or the like.

Furthermore, in Patent Document 1, an enlarging slit portion is processed by the grinding, and the resolution of the depth control of the enlarging slit portion depends on the diameter of the used grindstone. In consequence, an irregularity is made in a slit width between the inner peripheral portion of the die and the outer peripheral portion thereof, and hence a problem occurs that a forming defect such as a cell defect easily occurs. Moreover, another problem occurs that if the discontinuous portion of the slit width occurs in the enlarging slit portion and an ordinary portion even within one slit, the forming defect is easily caused in the discontinuous portion.

The present invention has been developed in view of such problems of the conventional technology, and an object thereof is to provide a honeycomb extrusion-forming die which can impart higher dimensional precision and strength even to a honeycomb structure including pentangular or more polygonal lattice-like cells or cells having large and small sizes, and a manufacturing method of the die.

SUMMARY OF THE INVENTION

According to the present invention, a manufacturing method of a die for forming a honeycomb structure is provided as follows.

[1] A die for forming a honeycomb structure, comprising: in one end face of a plate-like die base member, a clay supply face provided with a plurality of introduction holes through which a clay made of a ceramic forming material is introduced; and in the other end face of the die base member, a clay forming face provided with lattice-like slits having been connected to the introduction holes in the die base member, and through which the clay is extruded to form a formed honeycomb article, at least a part of a plurality of lattice-like partition regions defined by the slits in the clay forming face being provided in such a position that an extended line of the at least part of a plurality of lattice-like regions overlap with the slits at the edges thereof in a plane seen from a thickness direction of the die base member, the slits including an inner peripheral slit formed in an inner peripheral region of the clay forming face and having a slit width set to a predetermined width, and an outer peripheral slit formed in an outer peripheral region which surrounds the periphery of the inner peripheral region of the clay forming face and having a width-enlarged portion in the slit which has a width larger than that of the inner peripheral slit.

[2] The die for forming the honeycomb structure according to [1], wherein the slit width of the outer peripheral slit at the width-enlarged portion gradually increases starting from a boundary between the inner peripheral region and the outer peripheral region toward the outer peripheral side of the die base member.

[3] The die for forming the honeycomb structure according to [2], wherein the slit width of the outer peripheral slit at the width-enlarged portion increases at a constant rate per pitch of the lattice-like partition regions starting from the boundary between the inner peripheral region and the outer peripheral region toward the outer peripheral side of the die base member.

[4] The die for forming the honeycomb structure according to any one of [1] to [3], wherein the width of the width-enlarged portions of the outer peripheral slits becomes narrow so as to be equal to the predetermined width of the silt in the inner peripheral region at the end of the width-enlarged portion on the side of the clay supply face, and the reaching depth of the end of the formed slit having a width-enlarged portion gradually increases, starting from the boundary between the inner peripheral region and the outer peripheral region toward the outer peripheral side of the die base member, whereby the clay is passed while the flow rate of the clay from the introduction holes to the slits per unit time is kept in a stationary state during the extrusion of the clay, and a difference in a forming speed between the inner peripheral region and in the outer peripheral region is kept within a range of 5 mm/s or less.

[5] The die for forming the honeycomb structure according to [4], wherein every end of width-enlarged portions of the slits is aligned so as to be positioned along a slope formed when the every end is connected by a straight line by making the ends deepened one by one in the thickness direction of the die base member, starting from the boundary between the inner peripheral region and the outer peripheral region toward the outer peripheral side of the die base member.

[6] The die for forming the honeycomb structure according to any one of [1] to [5], wherein a thickness of at least a part of the outer peripheral region becomes thicker so as to form an ascendently thickened area in the outer peripheral portion in the thickness direction of the die base member starting from the boundary between the inner peripheral region and the outer peripheral region toward the outer peripheral side of the die base member.

[7] The die for forming the honeycomb structure according to any one of [1] to [6], wherein the variance in the surface roughness (Ra) within every slit inclusive of the width-enlarged portion is 1 μm or less.

[8] The die for forming the honeycomb structure according to any one of [1] to [7], wherein the fluctuation of the depth precision in the width-enlarged portions of the outer peripheral slits at intersecting portions of the slits is 100 μm or less.

[9] A manufacturing method of the die for forming the honeycomb structure according to any one of [4] to [8], comprising: a step of forming a plurality of introduction holes in one end face as a clay supply face of a die base member; a step of forming slits having a predetermined width including inner peripheral slits by subjecting another end face as a clay forming face of the die base member to a first electric discharging treatment with pressing a first comb-teeth electrode provided with a plurality of thin-plate-like first projection electrodes having dimensions corresponding to sides constituting the inner peripheral slits onto the other face; and, after the first electric discharging, a step of forming slits having width-enlarged portion by subjecting a part of silts having a predetermined width formed in a peripheral portion in the clay forming surface to a second electric discharging treatment with pressing a second comb-teeth electrode provided with thin-plate-like second projection electrodes provided at positions corresponding to respective slits in the peripheral portion so as to make the electrodes faced in parallel with both sides of respective slits and having a tip structure to form slits having width-enlarged portions in such a predetermined shape that ends opposite to the clay forming face form a slope when the respective ends are connected with a straight line.

According to the die for forming the honeycomb structure and the manufacturing method of the die of the present invention, higher dimensional precision and isostatic strength can be imparted even to the honeycomb structure including pentangular or more polygonal lattice-like cells or cells having different sizes, that is, large and small sizes, and such an excellent die for forming the honeycomb structure can be manufactured.

DETAILED DESCRIPTION OF THE INVENTION

Figure 1A:
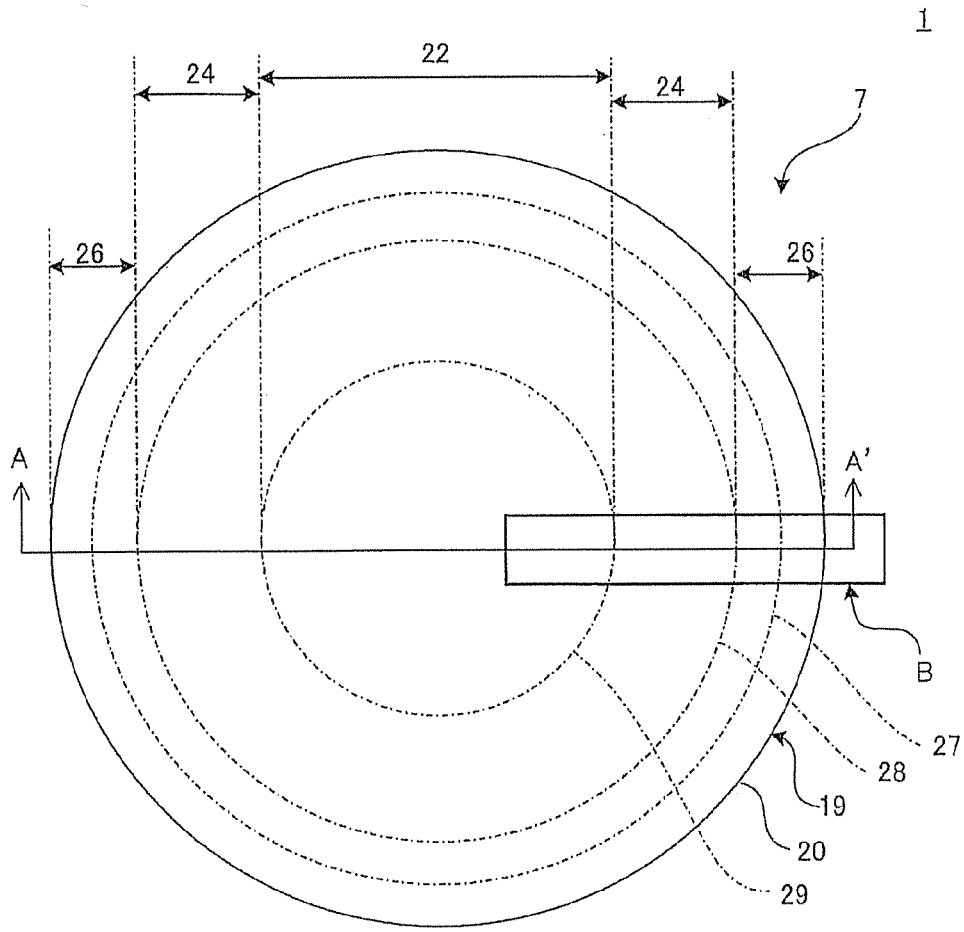
FIG. 1A is a schematic plan view schematically showing a die for forming a honeycomb structure of the present invention.

Hereinafter, an embodiment of a manufacturing method of a die for forming a honeycomb structure of the present invention will be described in detail with reference to the drawings. However, the present invention is not limited to this embodiment when interpreted, and various alterations, modifications and improvements can be added based on the knowledge of a person with ordinary skill without departing from the scope of the present invention.

Needless to say, the die for forming the honeycomb structure of the present invention is not limited to embodiments and constitutions shown in the drawings, and especially the positions and shapes of introduction holes 4 and slits 5 can appropriately be changed in accordance with a desired lattice-like slit shape. To explain the outline of the present invention, the present invention will schematically be described with respect to the specific embodiments shown as examples in the drawings.

(Die for Forming Honeycomb Structure)

Figure 1B:
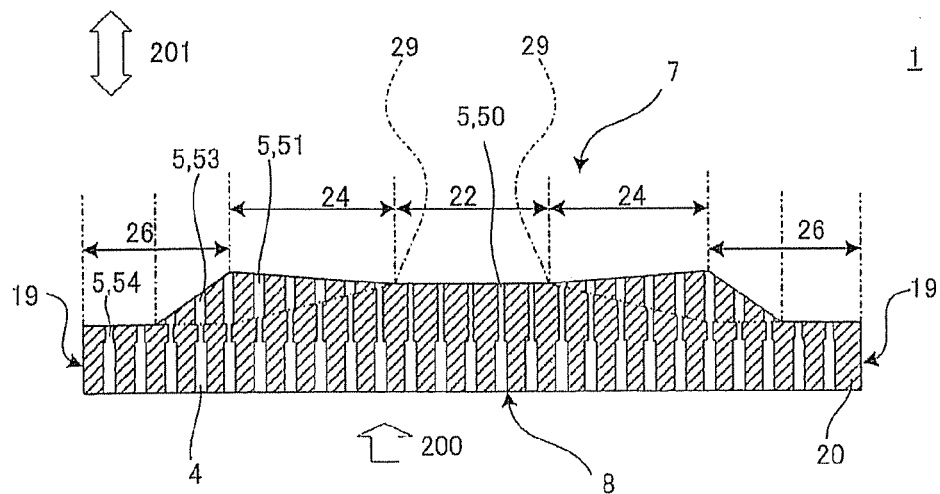
FIG. 1B is a sectional view cut along the A-A' line of FIG. 1A and schematically showing one embodiment of the die for forming the honeycomb structure of the present invention.
Figure 1C:
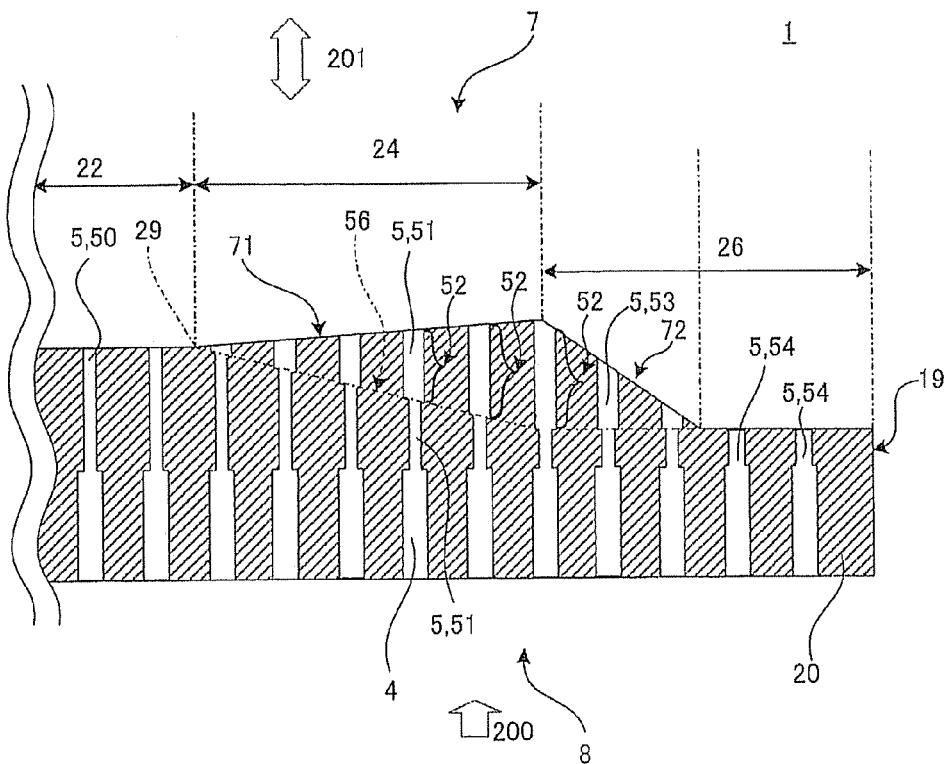
FIG. 1C is a partially enlarged sectional view schematically showing the embodiment of the die for forming the honeycomb structure of the present invention.
Figure 1D:
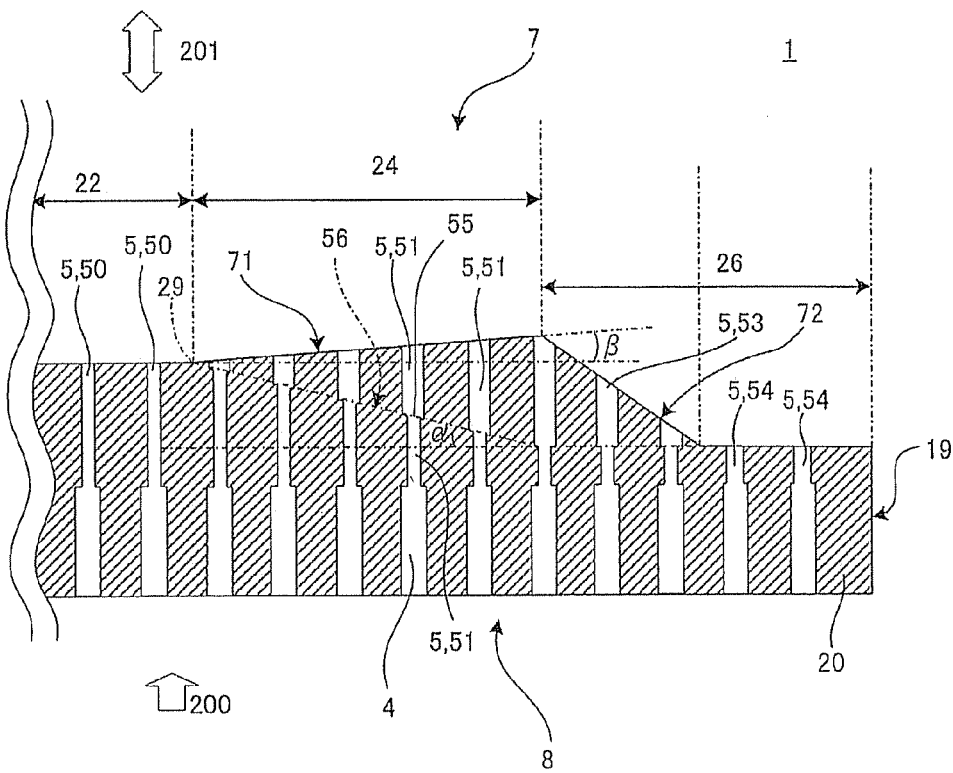
FIG. 1D is a partially enlarged sectional view schematically showing the embodiment of the die for forming the honeycomb structure of the present invention.

FIG. 1A is a schematic plan view schematically showing a die for forming a honeycomb structure of the present invention. FIG. 1B is a sectional view cut along the A-A' line of FIG. 1A and schematically showing one embodiment of the die for forming the honeycomb structure of the present invention. FIG. 1C is a partially enlarged sectional view schematically showing the embodiment of the die for forming the honeycomb structure of the present invention, and showing a further enlarged right half of FIG. 1B. In the same manner as in FIG. 1C, FIG. 1D is a partially enlarged sectional view schematically showing the embodiment of the die for forming the honeycomb structure of the present invention, with paying an attention to the angles of the slopes formed by the respective portions (an angle α formed between the line drawn by connecting the slant ends of width-enlarged portions with a straight line (hereinafter sometimes referred to as line 56) and the extended line drawn along the flat surface of the outermost peripheral region in the clay forming face of the die base member, and an angle β formed between the extended line of the surface of the inner peripheral region and the slant line formed by connecting the ends of the width-enlarged portions in the outer peripheral region with a straight line; detailed explanation will be made hereinafter).

Figure 1E:
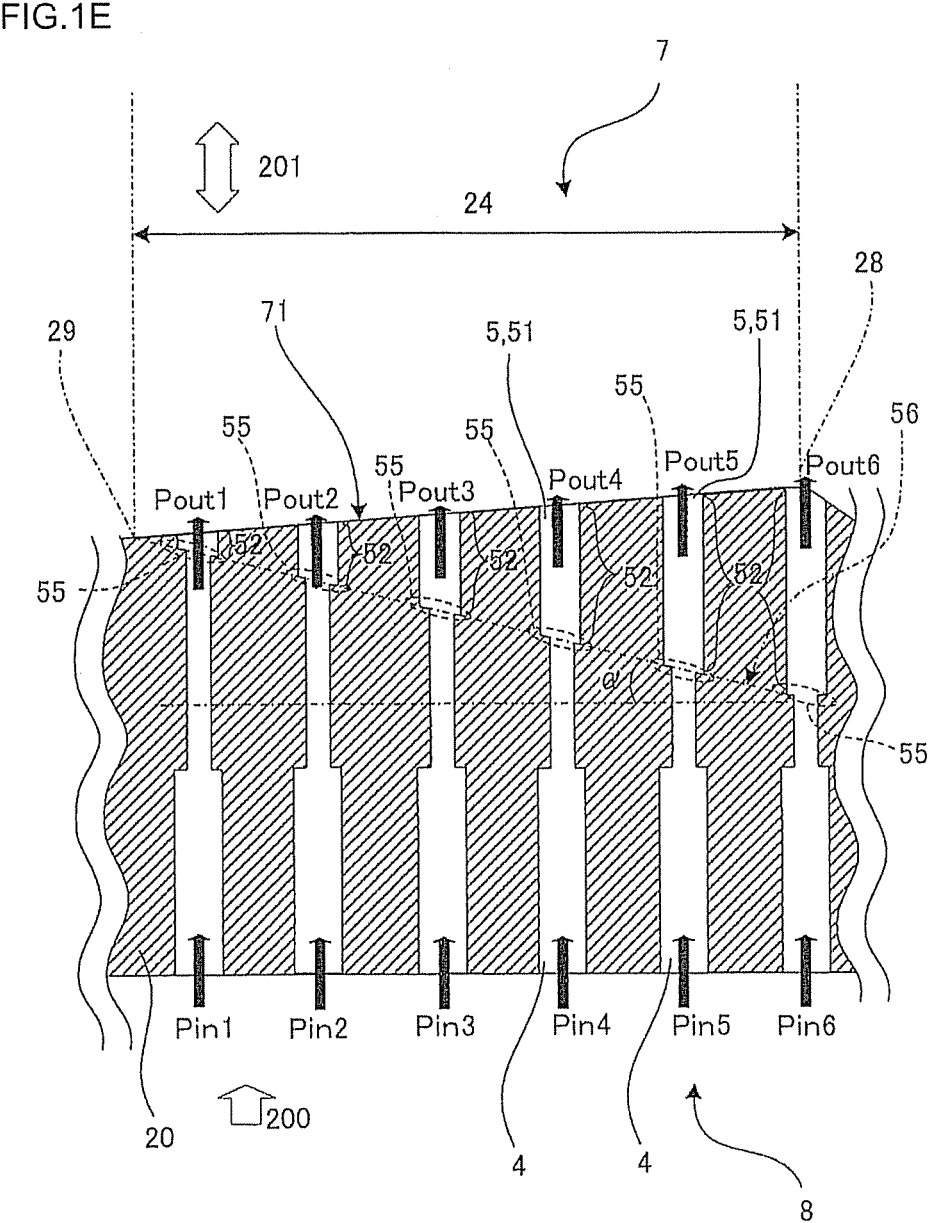
FIG. 1E is a partially enlarged sectional view schematically showing the embodiment of the die for forming the honeycomb structure of the present invention.
Figure 1F:
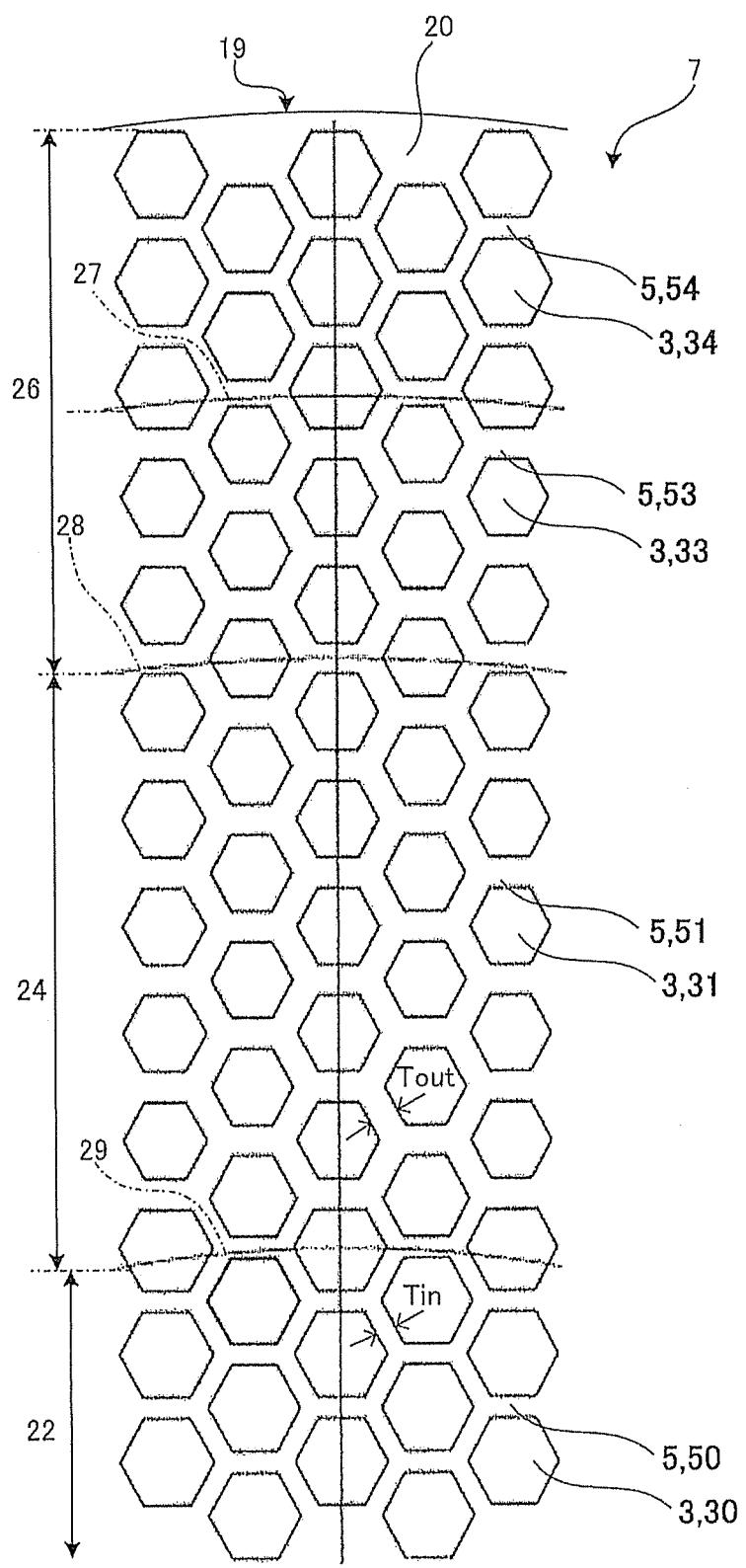
FIG. 1F is a partially enlarged plan view schematically showing a region B of FIG. 1A of the die for forming the honeycomb structure in the embodiment of the present invention.
Figure 1G:
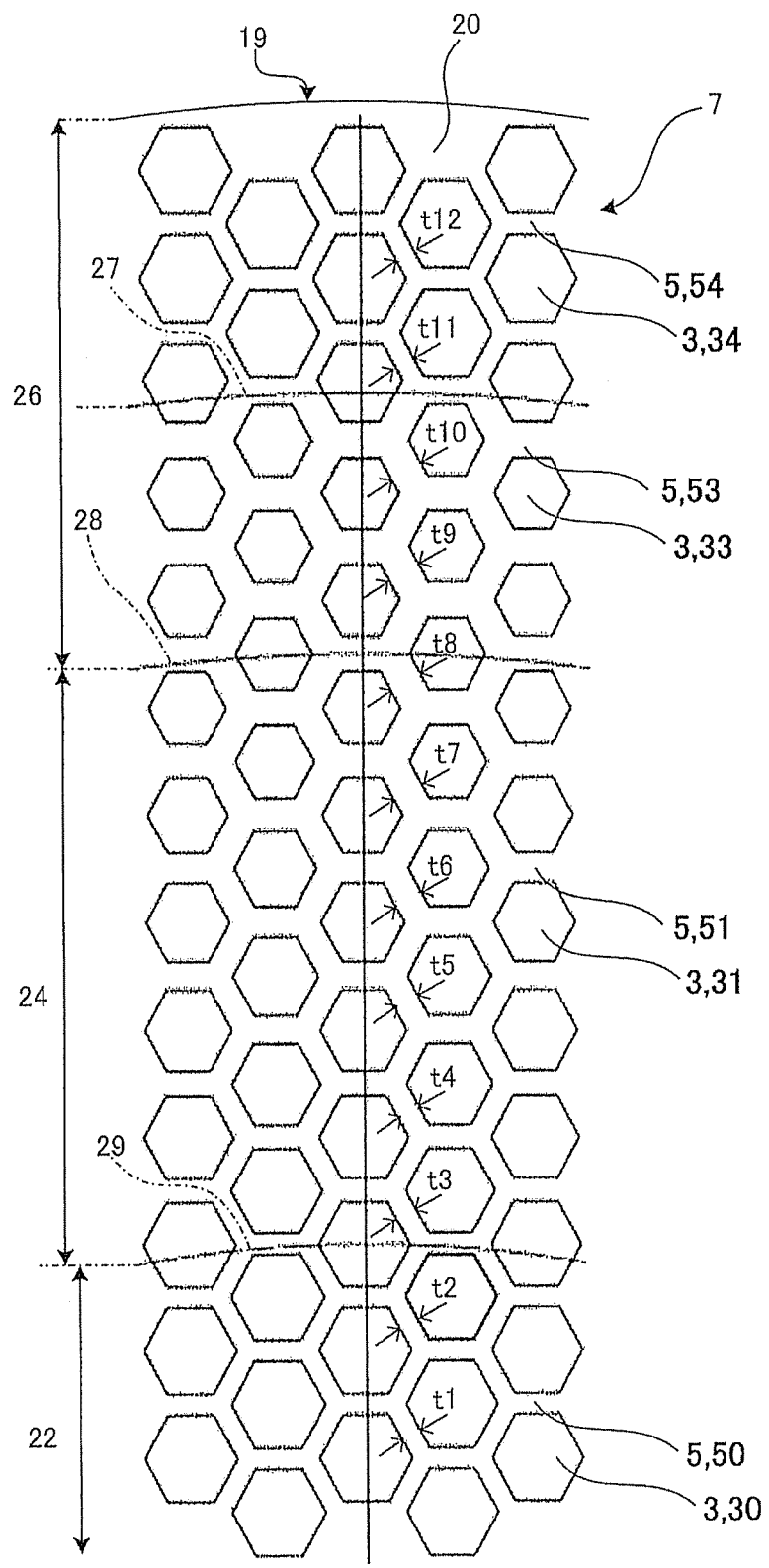
FIG. 1G is a partially enlarged plan view schematically showing the region B of FIG. 1A of the die for forming the honeycomb structure in another embodiment of the present invention.

FIG. 1E is a partially enlarged sectional view schematically showing the embodiment of the die for forming the honeycomb structure of the present invention, and shows an outer peripheral region 24 of FIG. 1C. FIG. 1F is a partially enlarged plan view schematically showing a region B of FIG. 1A of the die for forming the honeycomb structure in the embodiment of the present invention, and shows the slit widths of an inner peripheral slit and an outer peripheral slit of an inner peripheral portion 22 and the outer peripheral region 24 and the like. FIG. 1G is a partially enlarged plan view schematically showing the region B of FIG. 1A of the die for forming the honeycomb structure in another embodiment of the present invention.

The die for forming the honeycomb structure of the present invention includes, in one end face of a plate-like die base member, a clay supply face 8 provided with a plurality of introduction holes 4 through which a clay made of a ceramic forming material is introduced, and in the other end face of the die base member, a clay forming face 7 provided with lattice-like slits 5 which are connected to the introduction holes 4 in the die base member and through which the clay is extruded to form a formed honeycomb article. Furthermore, in the die for forming the honeycomb structure of the present invention, as shown in a plane seen from a thickness direction 201 of the die base member, that is, in FIG. 1A and plan views of FIGS. 1F, 1G and the like showing the partially enlarged region B of FIG. 1A, at least a part of a plurality of lattice-like partition regions 3 defined by the slits 5 in the clay forming face 7 is provided so as to overlap with the extended line formed by connecting the edges of the slits 5 with a line. In addition, in the die for forming the honeycomb structure of the present invention, as shown in FIG. 1C, the slits 5 include an inner peripheral slit 50 formed in an inner peripheral region 22 of the clay forming face 7 and having a slit width set to a predetermined width, and an outer peripheral slit 51 formed in the outer peripheral region 24 which surrounds the periphery of the inner peripheral region 22 of the clay forming face 7 and provided with a width-enlarged portion 52 having a portion wider than that of the inner peripheral slit 50.

Figure 2:
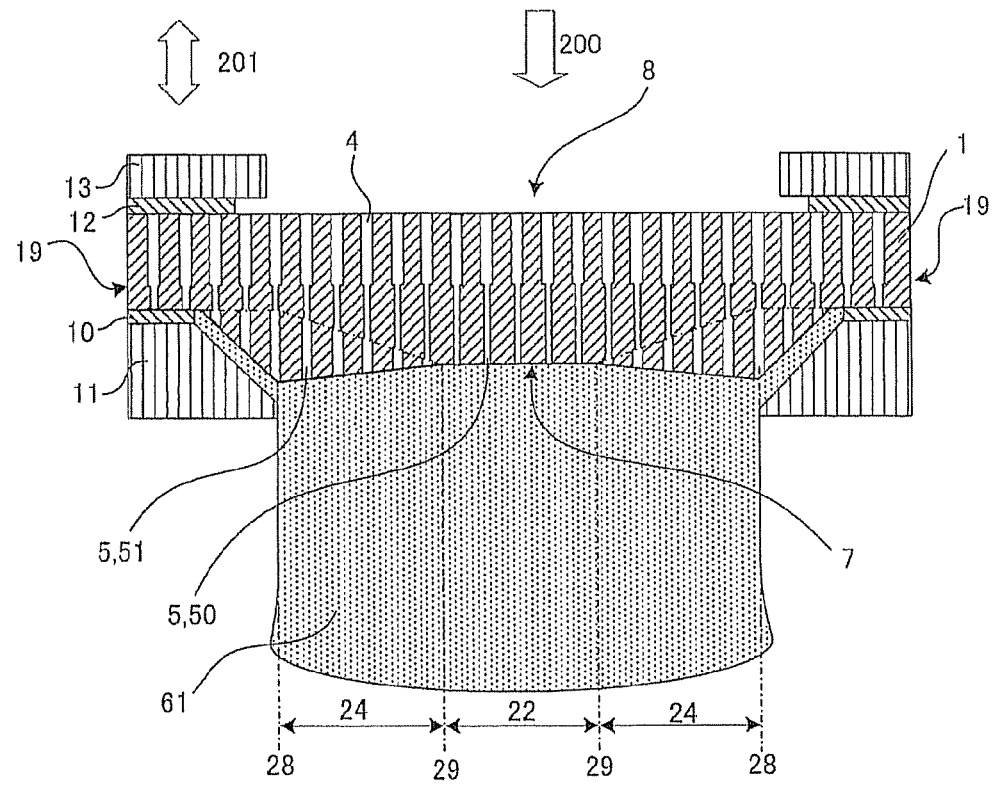
FIG. 2 is an explanatory view for explaining a use method of the die for forming the honeycomb structure of the present invention.

FIG. 2 is an explanatory view for explaining a method for extrusion-forming the formed honeycomb article by use of the die for forming the honeycomb structure of the present invention. As shown in this drawing, a die 1 is fixed to a pressing plate and a back pressing plate 13 via a spacer 10 and a back spacer 12. The spacer, pressing plate, back spacer and back pressing plate are appropriately regulated so that the flow rate of the clay or the dimension of the outer peripheral portion of the formed honeycomb article can be regulated.

The clay which has flowed into the introduction holes 4 of the clay supply face 8 of the die is rectified through the slits 5 connected to one another in the die, and is extruded through the clay forming face 7 to form a formed honeycomb article 61. As shown in the example of FIG. 1F, a slit width (Tin) of the inner peripheral slit 50 of the inner peripheral region 22 is a predetermined width. Moreover, a slit width ((Tout)) of an outer peripheral slit 51 of the outer peripheral region 24 is larger than the predetermined slit width of the inner peripheral slit. The expression "predetermined width" means in principle the thickness of slits to be used for forming partition wall which is a commonly employed in the ordinary die in the inner peripheral region, and its absolute value will be decided, depending upon the honeycomb structure to be extruded, however, usually within the range from 0.030 mm to 1.000 mm.

Figure 3A:
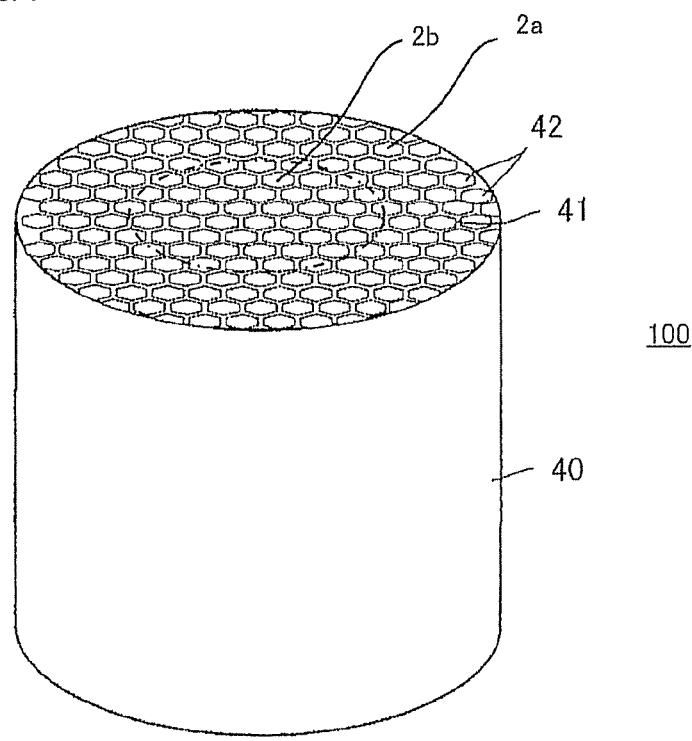
FIG. 3A is a schematic perspective view showing a honeycomb structure obtained by using the die for forming the honeycomb structure of the embodiment of the present invention.
Figure 3B:
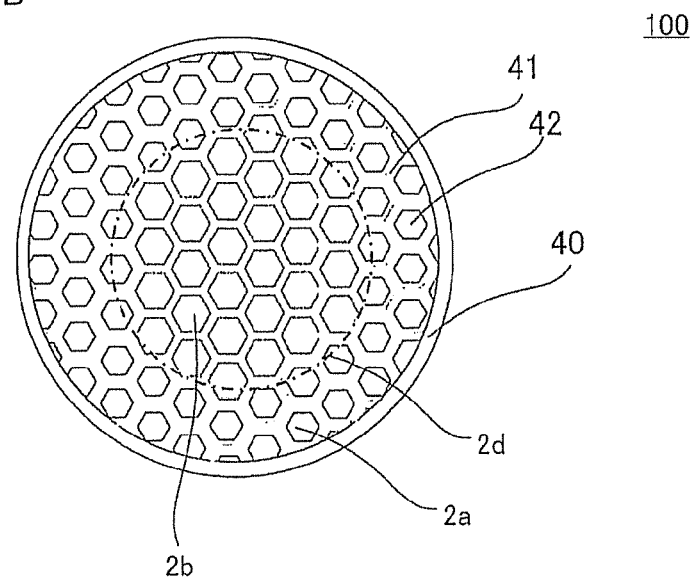
FIG. 3B is a schematic plan view showing the honeycomb structure obtained by using the die for forming the honeycomb structure of the embodiment of the present invention.
Figure 3C:
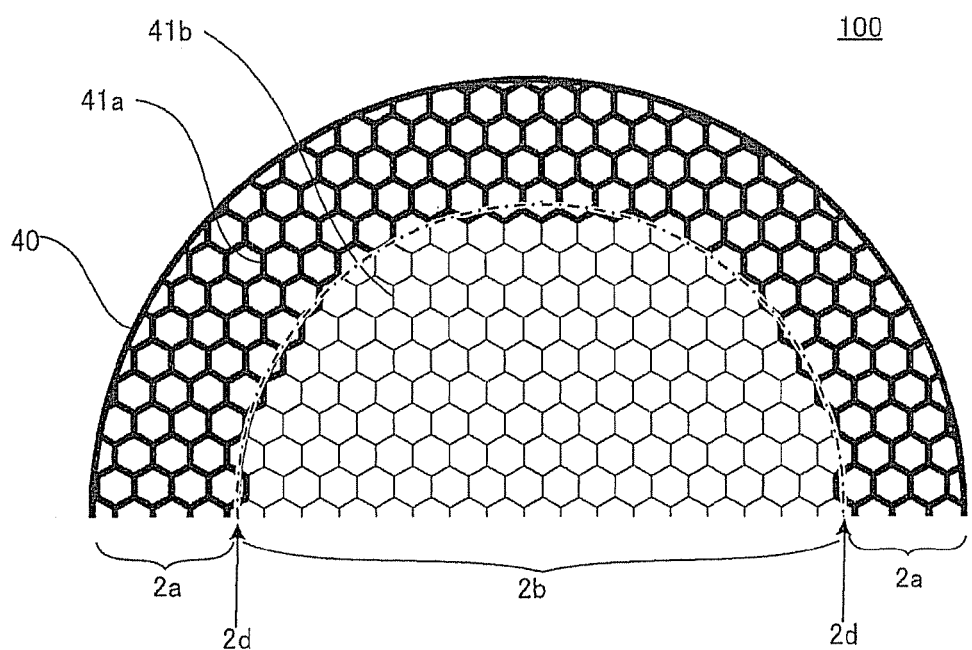
FIG. 3C is a schematic partially enlarged plan view showing the honeycomb structure obtained by using the die for forming the honeycomb structure of the embodiment of the present invention.

FIG. 3A is a schematic perspective view showing a honeycomb structure 100 obtained by drying and firing the formed honeycomb article obtained by using the honeycomb structure forming die 1 including hexagonal lattice-like slits in the embodiment of the present invention. Moreover, FIG. 3B is a schematic plan view showing the honeycomb structure of FIG. 3A. FIG. 3C is a schematic partially enlarged plan view showing the honeycomb structure obtained by using the die for forming the honeycomb structure of the embodiment of the present invention.

As described above, since the slit width (Tin) of the inner peripheral slit 50 of the inner peripheral region 22 is the predetermined width and the slit width (Tout) of the outer peripheral slit 51 of the outer peripheral region 24 is larger than the predetermined slit width of the inner peripheral slit, an outer peripheral partition wall 41a of outer peripheral cells 2a may be wider than that of an inner peripheral partition wall 41b of inner peripheral cells 2b, whereby it is possible to obtain a honeycomb structure having the increased strength of the outer peripheral portion thereof and having a high isostatic strength. Here, the expression "wider than" often means wider in a range of 1.1 to 3.0 times, preferably 1.2 to 2.3 times, compared with that of the predetermined width.

It is to be noted that the honeycomb structure 100 obtained by firing the formed honeycomb article extrusion-formed by using the honeycomb structure forming die 1 of the embodiment of the present invention as shown in FIGS. 3A, 3B and 3C may preferably be used for a catalyst carrier using a catalytic function in an internal combustion engine, a boiler, a chemical reaction apparatus, a reformer for a fuel cell or the like, a filter for collecting fine particles in an exhaust gas or the like.

As to the slit width of the width-enlarged portion in the slit of the outer peripheral region, if a discontinuous portion is generated in the slit width of the width-enlarged portion and that of the remaining portion, a forming defect is easily incurred. To avoid the defect, the slit width may vary continuously or stepwise.

In the die for forming the honeycomb structure of the present invention, the slit width of the outer peripheral slit 51 may be constant, but the outer peripheral slit is preferably formed so that the slit width thereof gradually increases starting from a boundary 29 between the inner peripheral region 22 and the outer peripheral region 24 toward the outer peripheral side (outer peripheral portion 19 side) of a die base member 20. Moreover, the outer peripheral slit is also preferably formed so that the slit width thereof increases at a constant rate per pitch of the lattice-like partition regions 3 defined by the slits 5. As shown in, for example, FIG. 1G, the slit width of the slit 5 preferably gradually increases from t3 to t8 starting from the boundary 29 between the inner peripheral region 22 and the outer peripheral region 24 toward the outer peripheral side (the outer peripheral portion of die base member 19 side) of the die base member 20. In this way, the slit width is gradually increased or the increase amount of the slit width is set to a constant rate, whereby it is possible to suppress the forming defect which has heretofore been easily generated in the discontinuous portion of the slit width.

In the die for forming the honeycomb structure of the present invention, as shown in FIG. 1E, the width of the width-enlarged portion 52 in the slit is enlarged from the clay forming face 7 to an end of width-enlarged end 55 as an end on a clay supply face 8 side (the downside in the drawing). Moreover, the reaching depth of the width-enlarged portion 52 from the clay forming face 7 preferably gradually increases starting from the boundary 29 between the inner peripheral region 22 and the outer peripheral region 24 toward the outer peripheral side (the die base member outer peripheral portion 19 side) of the die base member 20.

That is, in FIG. 1E, an end of width-enlarged portion 55 which is the lower end of the width-enlarged portion 52 of the outer peripheral slit 51 preferably deepens in a downward direction toward the right side. According to such a constitution, in a case where during the extrusion of the clay, the clay is passed while the flow rate of the clay from the introduction holes 4 to the slits 5 per unit time has a stationary state, and a difference ΔP between a pressure Pin of the clay supplied through the introduction holes 4 as inlets in the clay supply face 8 and a pressure Pout of the clay discharged through the slits as outlets in the clay forming face is defined as a clay pressure loss, a difference between the clay pressure loss in the inner peripheral region 22 and the clay pressure loss in the outer peripheral region 24 is preferably in a constant range. This is because the forming defect occurs owing to a difference of a forming speed in the clay forming face due to the difference between the pressure losses. However, it is difficult to measure the difference between the clay pressure losses of the inner peripheral region and the outer peripheral region. Therefore, it is assumed that when the difference between the clay pressure losses is set to the constant range, the forming speed of the formed article eventually becomes constant, and this forming speed is preferably set to a constant speed. The difference between the forming speed of the inner peripheral region and the forming speed of the outer peripheral region is preferably 5 mm/s or less, further preferably 2 mm/s or less.

In the die for forming the honeycomb structure of the present invention, the slant face of the outer peripheral region 71 at the clay forming face due to the gradual increase in the thickness in the vertical direction 201 of the die base member 20 in the section starting from the boundary between the inner peripheral region and the outer peripheral region toward the outer peripheral side of the die base member 20. In case of the embodiment shown in FIG. 1E, at least a part of the outer peripheral region 24 forms preferably the slant face of the outer peripheral region 71 where the clay forming face 7 becomes thicker in the thickness direction 201 (an upward direction in the drawing) of the die base member 20 starting from the boundary 29 between the inner peripheral region and the outer peripheral region 24 toward the outer peripheral side (the die base member outer peripheral portion 19 side, on the right side in the drawing) of the die base member 20. According to such a constitution, the extrusion speed of the formed article during the extrusion-forming can be flattened in the inner peripheral region 22 and the outer peripheral region 24, whereby it is possible to prevent an enwinding pattern defect having such a shape that the honeycomb structure is inwardly enwound. Moreover, a forming pattern is easily regulated, and hence it is possible to increase the production efficiency of the honeycomb structure. In the cross section of the die base member 20 in the thickness direction 201, the slant face of the outer peripheral region 71 in the outer peripheral region forms preferably a curve corresponding to the change of the pressure loss, but may be a straight line when the change of the pressure loss is small.

When the slant face of the outer peripheral region 71 in the outer peripheral region is linear in the cross section of the die base member 20 in the thickness direction 201, the angle β formed between of the surface of the slant face of the outer peripheral region 71 in the outer peripheral region and the extended line from the surface of the inner peripheral portion may appropriately be changed in accordance with the desired slit shape, the outer diameter size of the formed honeycomb article to be extrusion-formed, the ratio of the length of the die base member 20 in the outer diameter direction between the inner peripheral region and the outer peripheral region and the type of the forming material, but the angle is generally preferably in a range of 0.5 to 8°, further preferably in a range of 1 to 5°.

In the die for forming the honeycomb structure of the present invention, the ends of width-enlarged portions 55 are preferably aligned so as to be positioned along a slope formed when each of the ends is connected by a straight line by making the ends deepened one by one in the thickness direction 201 of the die base member 20 starting from the boundary 29 between the inner peripheral region and the outer peripheral region toward the outer peripheral side of the die base member 20. In case of the embodiment shown in FIG. 1E, the ends of width-enlarged portions 55 are preferably aligned so as to be positioned along a slope formed when every end is connected by a straight line by making the ends deepened one by one (deepen in a downward direction in the drawing) in the thickness direction 201 of the die base member 20 starting from the boundary 29 between the inner peripheral region and the outer peripheral region 24 toward the outer peripheral side (the right side in the drawing) of the die base member 20.

According to such a constitution, when the difference ΔP between the pressure (Pin) of the clay supplied through the introduction holes 4 as the inlets in the clay supply face 8 and the pressure (Pout) of the clay discharged through the slits as the outlets in the clay forming face is defined as the clay pressure loss, the fluctuation of this clay pressure loss continuously changes along the slope 56 defined by a line formed by connecting the ends of the width-enlarged portions 55, and the forming defect during the formation of the formed honeycomb article may be suppressed.

FIG. 1E shows pressures Pin1 to Pin6 of the clay supplied through the introduction holes 4 as the inlets in the clay supply face 8 and pressures Pout1 to Pout6 of the clay discharged through the slits 5 as the outlets in the clay forming face 7. Moreover, the volume of the width-enlarged portion 52 increases for each pitch of the lattice-like partition regions 3 defined by the slits 5 shown in FIG. 1G. When as in another embodiment shown in FIG. 1G, the slit width of the outer peripheral slit 51 is increased gradually from t3 to t8, or in an constant amount, the change of the clay pressure loss can be smooth.

Specifically, by making the angle α between the line formed by connecting the respective ends of the width-enlarged portions with a straight line and the extended line of the surface of the outermost peripheral region shown in FIG. 1D decreased, can be compensated the clay pressure loss due to the gradual increase of the slit width. The angle α may appropriately be changed in accordance with the desired slit shape, the outer diameter size of the formed honeycomb article to be extrusion-formed, the ratio between the lengths of the die base member 20 along the outer diameter direction in the inner peripheral region and the outer peripheral region and the forming material, but the angle is generally preferably in a range of 20 to 60°, further preferably in a range of 30 to 50°.

In this way, the reaching depth of the width-enlarged portion 52, that is, the reaching depth of the end of width-enlarged portion 55 from the clay forming face 7 is increased or decreased in accordance with the desired slit width, whereby the variance of the clay pressure loss may be set to a constant range. Alternatively, the angle α of the slant face defined by the respective ends of width-enlarged portions at the outermost peripheral region 26 when the respective ends of are aligned on the line 56 may appropriately be regulated to set the variance of the clay pressure loss to the constant range.

The clay pressure loss is preferably as continuous as possible among the adjacent slits in the vicinity or the continuous slits, to improve the forming properties of the formed honeycomb article. Especially in recent years, with strict environmental standards, the thinning of walls and the increase of a cell density in the honeycomb structure have been demanded, and the forming properties of the formed honeycomb article are remarkably increasingly influenced by the variance of the clay pressure loss among the above adjacent slits in the vicinity or the continuous slits. To solve the problem, as shown in FIG. 1E, the ends of width-enlarged portion 55 are aligned along the line 56 by making the ends deepened one by one in the thickness direction 201 of the die base member 20 (deepen in the downward direction in the drawing) starting from the boundary 29 between the inner peripheral region and the outer peripheral region 24 toward the outer peripheral side (the right side in the drawing) of the die base member 20, and the end face of the width-enlarged portion is sloped, which improves the continuity of the clay pressure loss at the slit positions to contribute to the improvement of the forming properties of the formed honeycomb article. In the cross section of the die base member in the thickness direction, the line 56 may be a curve, but is preferably a straight line. Reasons for provision of thus aligned ends in the above-mentioned manner are that the slant angle of the line is made even and given continuity and that processing is facilitated.

The pressures Pin1 to Pin6 in FIG. 1E are substantially constant, and hence the clay pressure losses ΔP between these inlet pressures and the outlet pressures Pout1 to Pout6 at the respective positions can generally be regulated in accordance with the reaching depth of the ends of the width-enlarged portions and the angle of the slant face of the outer peripheral region (71 in the drawing). Actually, in accordance with a slit lattice shape, the slits are connected to one another in portions which are not shown in the drawing, and the orientation of the slits can vary in accordance with the lattice shape, whereby the clay pressure loss can preferably appropriately be regulated in accordance with the desired slit shape and slit spaces.

In the die for forming the honeycomb structure of the present invention, the variance of the surface roughness (Ra) of slit portions is preferably 0.50 μm or less. The uniform surface roughness (Ra) of each slit portion can be realized by forming all the slit portions by electric discharge processing.

If the surface roughness (Ra) of each slit portion is non-uniform, a defect in clay forming might be caused.

It is to be noted that "the surface roughness" mentioned in the present invention is the surface roughness measured in conformity to JIS B0601-1994. Specifically, an only reference length is extracted from a roughness curve in the direction of the average line of the curve, the surface roughness curve of this reference length is folded back at the average line as a reference, and a value obtained by dividing an area surrounded by the surface roughness curve and the average line of the curve by the reference length is defined as the surface roughness (Ra) indicated in micrometer ($\mu$m). In the present invention, a reference length L=0.25 mm. The surface roughness is preferably measured in a range of 0.080 to 0.80 mm in accordance with the die slit depth of a measurement target.

In the die for forming the honeycomb structure of the present invention, the fluctuation of the precision of the reaching depth of the width-enlarged slit portion at the intersecting portions of the slits is preferably 100 $\mu$m or less. In the die for forming the honeycomb structure including cells having a pentangular or more polygonal lattice-like shape or cells having different sizes, that is, large and small sizes as in the die for forming the honeycomb structure of the present invention, it is difficult to realize such a dimensional precision range by grinding with a disc grindstone.

Furthermore, each end of width-enlarged portion 55 is aligned along the line 56 and resultantly forms a slant shape (slant in the downward direction in the drawing) so as to deepen in the thickness direction 201 of the die base member 20 starting from the boundary 29 between the inner peripheral region and the outer peripheral region 24 toward the outer peripheral side (the right side in the drawing) of the die base member 20, and thus the end of width-enlarged portion has a slant face with a shape corresponding to the line 56. It has practically been impossible to process such a complicated shape by the above grinding. In the die for forming the honeycomb structure of the present invention, such complicated processing is realized by the electric discharge processing by use of the combination of a plurality of second comb-teeth electrodes having a high dimensional precision and a special shape, and this will be described later in detail.

In other words, the above depth of the width-enlarged portion 52 of the outer peripheral region 24 from the clay forming face 7 is gradually decreased from the outer peripheral portion 19 side to the boundary 29 between the outer peripheral region 24 and the inner peripheral region 22 to alleviate the influence of the clay pressure loss difference between the inner peripheral region 22 and the outer peripheral region. Therefore, when the second electric discharge processing for forming the width-enlarged portion is performed, the amount of a removed portion increases from the boundary to an outermost peripheral region 26, and hence it has been difficult to precisely obtain a processing depth having a predetermined distribution. To avoid this problem, the slit width may vary continuously or stepwise. However, in the same manner as in the above "depth", since the amount of the removed portion varies, wear on electrodes varies from the boundary to the outermost peripheral portion, and it has been difficult to obtain the predetermined precision of the slit width.

In consideration of the wear on the electrodes, the distribution of electrode rib widths is preferably larger than a predetermined slit width distribution from the boundary to the outermost peripheral portion. A processing solution is preferably caused to flow from the boundary to the outermost peripheral portion, and the predetermined slit width distribution is obtained by utilizing secondary electric discharge. When the secondary electric discharge is utilized, the widths of projection electrodes may be smaller than the predetermined slit width distribution from the boundary between the inner peripheral region and the outer peripheral region to the outermost peripheral region.

Moreover, the outer peripheral slit broadens, and hence the clay pressure loss needs to be increased. Therefore, to obtain the uniform clay pressure loss in the inner peripheral portion and the outer peripheral portion, the clay forming face 7 is preferably sloped in the outer peripheral region. Furthermore, the uniform surface roughness in the slits of the outer peripheral portion and the inner peripheral portion is obtained. Moreover, the outer peripheral portion is regulated and processed so that the ends of the width-enlarged portions in the lattice-like intersecting slits in the outer peripheral portion have an equal depth.

The dimensions (widths) of the first and second comb-teeth electrodes are determined by a target slit width and an electric discharge gap in the die. The electrodes may be processed by cutting. Alternatively, after the grinding, the dimensions of the electrodes may be regulated by the cutting. The shape of the electrodes for slit processing is not limited to the above comb-teeth shape, and the electrodes may have such an integral shape that a desired cell shape can be transferred. Even in this case, the slit width can easily be changed stepwise or continuously.

In consideration of the electrode wear on the second comb-teeth electrode, the heights of the projection electrodes from the boundary to the outer peripheral portion 19 side are larger than the predetermined depth distribution. The processing solution for the electric discharge processing is caused to flow from the boundary to the outermost peripheral portion, and the predetermined depth distribution is obtained by utilizing the secondary electric discharge. When the secondary electric discharge is utilized, the heights of the second projection electrodes may be smaller than the predetermined depth distribution from the boundary to the outermost peripheral region.

Moreover, examples of the honeycomb structure as the forming target of the die for forming the honeycomb structure of the embodiment of the present invention include not only the above honeycomb structure having the above whole columnar shape but also honeycomb structures having an elliptic post-like shape, a quadrangular post-like shape, another polygonal post-like shape, a rounded triangular post-like shape and another rounded polygonal post-like shape. In this case, the inner peripheral region, the outer peripheral region and a ratio between the regions in the die of the present embodiment can appropriately be changed in accordance with the whole shape of the honeycomb structure.

Moreover, examples of the honeycomb structure as the forming target of the die for forming the honeycomb structure of the embodiment of the present invention include the above honeycomb structure having the hexagonal lattice-like cells, and also include a plugged honeycomb structure in which the sizes of cell open frontal areas in one end face are different from those in the other end face. The plugged honeycomb structure having the sizes of the cell open frontal areas in the one end face which are different from those in the other end face thereof is one type of plugged honeycomb structure in which the sizes of the cell open frontal areas in the one end face (e.g., an inflow end face) are different from those in the other end face (e.g., an outflow end face).

The plugged honeycomb structure generally has a plurality of cells defined by porous partition walls as through channels for a fluid. Especially in a case where the structure is used as a fine particle collecting filter, the adjacent cells are plugged at opposite ends so that the end faces have a checkered pattern. In such a honeycomb structure, a fluid to be treated is caused to flow into a cell having an inflow pore side end face which is not plugged, that is, the cell having an outflow pore side end face plugged, passes through the porous partition wall, and is discharged from the adjacent cell, that is, the cell having the inflow pore side end face plugged and the outflow pore side end face which is not plugged. In this case, the partition walls function as a filter. When the honeycomb structure is used as a DPF, a particulate matter such as soot discharged from a diesel engine is collected by and deposited on the partition walls.

Figure 10A:
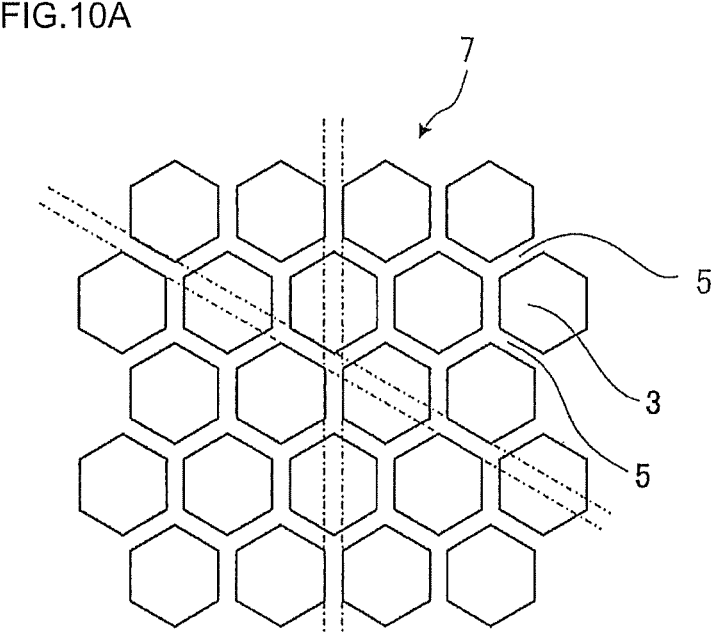
FIG. 10A is an explanatory view for explaining a state in which lattice-like partition regions in the embodiment of the die for forming the honeycomb structure of the present invention overlap with the extension of slits.
Figure 10B:
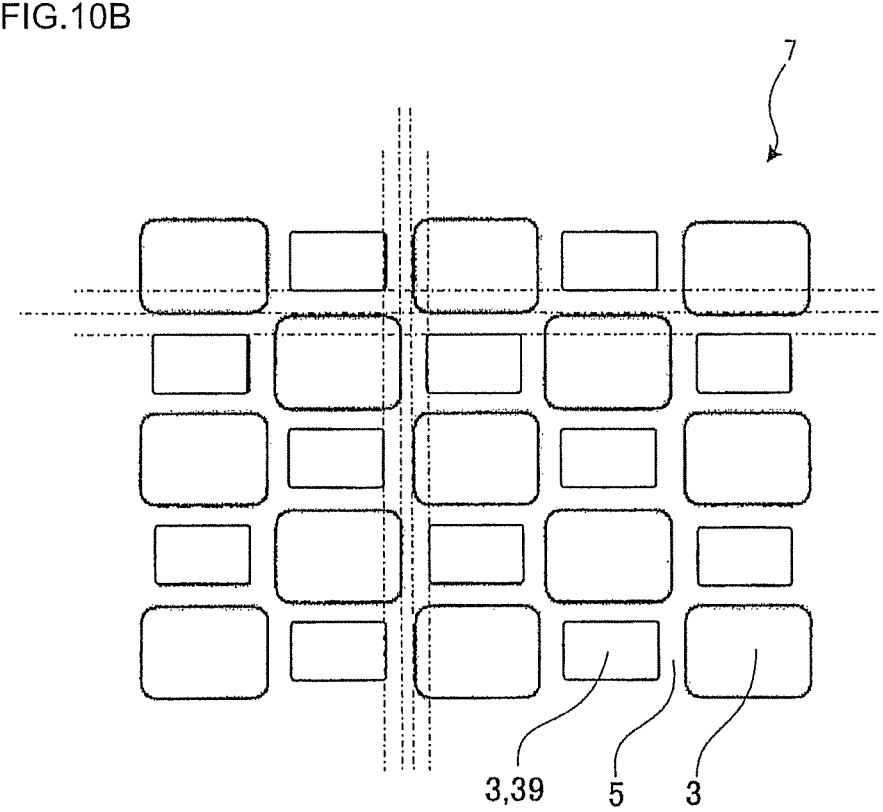
FIG. 10B is an explanatory view for explaining a state in which lattice-like partition regions in another embodiment of the die for forming the honeycomb structure of the present invention overlap with the extension of slits.

In a case where the die for forming the honeycomb structure of the embodiment of the present invention is applied to such a plugged honeycomb structure having the sizes of the cell open frontal areas in the one end face which are different from those in the other end face thereof, the application can be realized by imparting characteristics to a slit lattice shape, that is, the lattice-like partition regions defined by the slits. Specifically, as shown in FIG. 10B, the clay forming face of the die for forming the honeycomb structure is provided with lattice-like partition regions 3 having large and small sizes. Through drying and firing processes and the like after the extrusion-forming of the formed honeycomb article, the cells formed by the lattice-like partition regions having small areas are plugged on the side of the inflow pores of the fluid to be treated, and the adjacent cells are plugged at the mutually opposite ends.

Figure 10C:
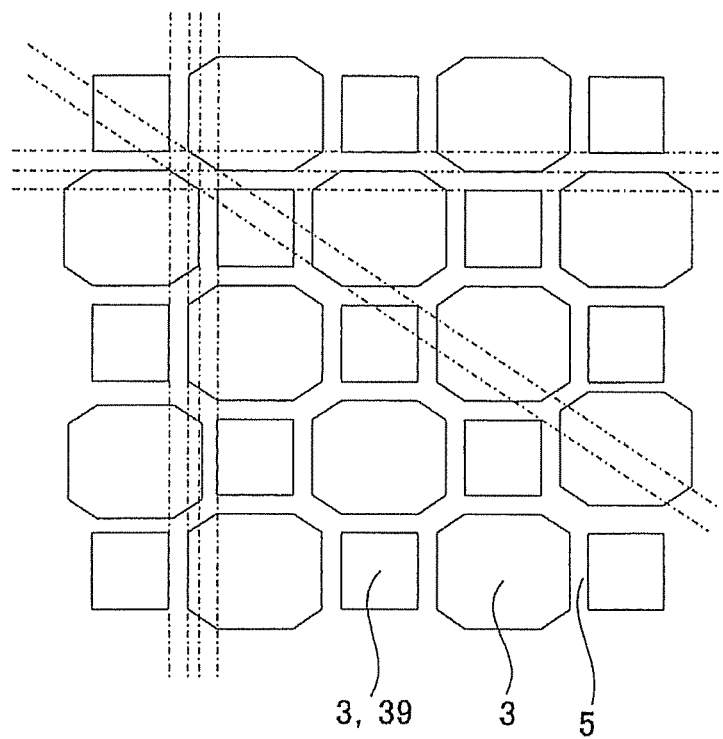
FIG. 10C is an explanatory view for explaining a state in which lattice-like partition regions in still another embodiment of the die for forming the honeycomb structure of the present invention overlap with the extension of slits.
Figure 10D:
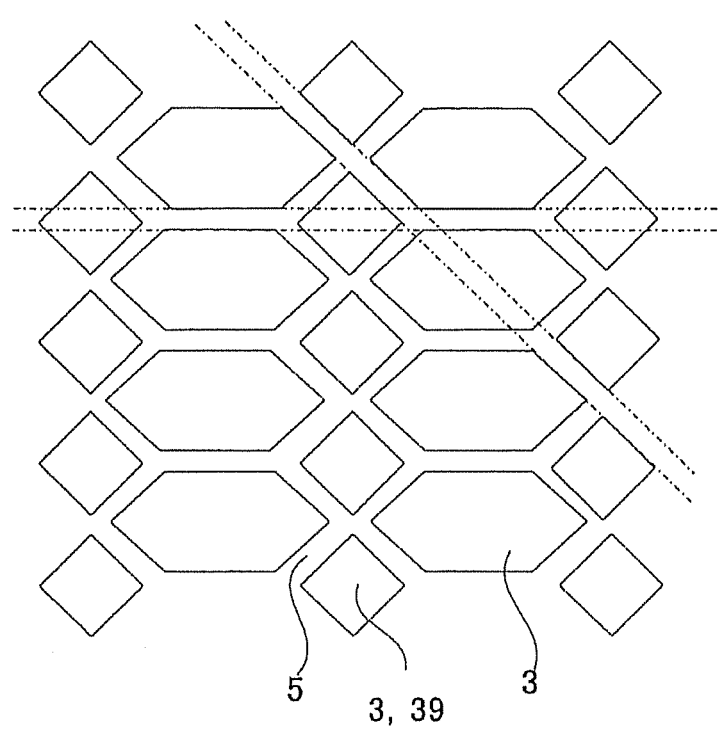
FIG. 10D is an explanatory view for explaining a state in which lattice-like partition regions in a further embodiment of the die for forming the honeycomb structure of the present invention overlap with the extension of slits.

In a case where the plugged honeycomb structure having the sizes of the cell open frontal areas in the one end face which are different from those in the other end face thereof is the target, examples of the lattice-like slits and the lattice-like partition regions defined by the slits in the die for forming the honeycomb structure of the embodiment include quadrangular lattice-like shapes having large and small sizes as shown in FIG. 10B, the combination of quadrangular and octagonal shapes shown in FIG. 10C, and the combination of quadrangular and hexagonal shapes shown in FIG. 10D. Furthermore, various conditions such as conditions for varying the slit widths of the inner peripheral region and outer peripheral region and conditions for providing the above width-enlarged portion conform to the above embodiments of the die for forming the honeycomb structure of the present invention.

In a case where the target of the die for forming the honeycomb structure of the embodiment of the present invention is the plugged honeycomb structure in which the sizes of the cell open frontal areas in the one end face are different from those in the other end face, the structure is similar to the honeycomb structure 100 shown in FIGS. 3A to 3C except cell shapes and provided plugging portions, and there is not any special restriction on another configuration as long as the sizes (the areas) of the inflow side cell open frontal areas are larger than those of the outflow side cell open frontal areas. The sectional shape of the plugged honeycomb structure having the sizes of the cell open frontal areas in the one end face which are different from those in the other end face thereof vertical to a central axis direction (the whole shape of the honeycomb structure) can be the combination of the quadrangular shapes having large and small sizes, or a polygonal shape such as a pentangular shape or a hexagonal shape. Moreover, a plurality of types of sectional shapes may be used. Such a plugged honeycomb structure having the sizes of the cell open frontal areas in the one end face which are different from those in the other end face thereof is preferably made of a ceramic material, further preferably a ceramic material containing an aggregate of silicon carbide such as SiC or Si—SiC.

It is to be noted that the sectional (cell sectional) shape of each cell vertical to the central axis thereof is preferably constant between both the end faces of the honeycomb structure. Moreover, in a case where the whole shape of such a plugged honeycomb structure having the sizes of the cell open frontal areas in the one end face which are different from those in the other end face thereof is a quadrangular post-like shape, a plurality of quadrangular post-like structures may be combined, and the side surfaces thereof may be bonded to one another. At this time, the individual bonded post-like honeycomb structures are referred to as honeycomb segments in the present description. Moreover, these combined, bonded and integrated honeycomb segments are referred to as a bonded segment type honeycomb structure.

The above honeycomb segments are combined, bonded, integrated and used as the bonded segment type honeycomb structure. As to the inner peripheral portion and outer peripheral portion of the bonded segment type honeycomb structure, the widths of the partition walls of the outer peripheral portion are increased as compared with those of the inner peripheral portion in the same manner as in the honeycomb structure shown in FIGS. 3A to 3C, whereby the isostatic strength can be improved.

The bonded segment type honeycomb structure in which the widths of the partition walls of the outer peripheral portion are increased as compared with those of the inner peripheral portion in this manner is referred to as the bonded segment type outer peripherally strengthening honeycomb structure in the present description. The die for forming the honeycomb structure of the present invention is also applicable to the manufacturing of the honeycomb segments used in such a bonded segment type outer peripherally strengthening honeycomb structure. Moreover, the honeycomb segments constituting the above bonded segment type outer peripherally strengthening honeycomb structure will be referred to as the outer peripherally strengthening honeycomb segments in the present description.

This outer peripherally strengthening honeycomb segment does not necessarily have such a shape that the width-enlarged portion of the partition wall surrounds the center of the outer peripherally strengthening honeycomb segment. This is because in accordance with a position where the segments are combined and integrated, the width-enlarged portion is provided inside or outside the outer peripherally strengthening honeycomb segment. When the outer peripherally strengthening honeycomb segments constitute the center of the bonded segment type outer peripherally strengthening honeycomb structure, the width-enlarged portion of the partition wall surrounds the center of the outer peripherally strengthening honeycomb segment.

Therefore, when such an outer peripherally strengthening honeycomb segment is formed in the embodiment of the present invention, the outer peripheral region of the die is preferably replaced with a segment outer peripheral region corresponding to the outer peripheral portion of the bonded segment type outer peripherally strengthening honeycomb structure. Moreover, the inner peripheral region of the die is preferably replaced with a segment inner peripheral region corresponding to the inner peripheral portion of the bonded segment type outer peripherally strengthening honeycomb structure. When the inner peripheral region and outer peripheral region of the die are replaced with the segment inner peripheral region and segment outer peripheral region in this manner, respectively, the constitutions and effects of the slant face of the outer peripheral region and the slant angle defined by the end of the thickened portion may accordingly be applicable to the inner peripheral portion and outer periphery of the bonded segment type outer peripherally strengthening honeycomb structure (not shown). This also applies to the second comb-teeth electrode and the use method thereof.

(Manufacturing Method of Die for Forming Honeycomb Structure)

Moreover, a manufacturing method of the die for forming the honeycomb structure of the present invention includes an introduction hole forming process of forming the plurality of introduction holes 4 in one end face as the clay supply face 8 of the die base member 20; a first electric discharge processing process of pressing a first comb-teeth electrode provided with a plurality of thin-plate-like first projection electrodes having dimensions corresponding to sides constituting the inner peripheral slit 50 onto the other end face as the clay forming face of the die base member 20 to form the slits including the inner peripheral slit and having the predetermined width by electric discharge processing; and after the first electric discharge processing process, a second electric discharge processing process of pressing a second comb-teeth electrode provided with a plurality of thin-plate-like second projection electrodes corresponding to parallel sides constituting the width-enlarged portion and each having a tip structure corresponding to the slant angle of the end of width-enlarged portion onto the other end face as the clay forming face provided with the slits including the inner peripheral slit and having the predetermined width in the first electric discharge processing process to form the width-enlarged portion by electric discharge processing.

(Material of Die Base Member)

Examples of a material used in the present embodiment include a metal or an alloy generally used ash material of the die for forming the honeycomb structure. Examples of the material include the metal or the alloy containing at least one metal selected from the group consisting of iron (Fe), titanium (Ti), nickel (Ni), copper (Cu) and aluminum (Al). It is to be noted that this metal or alloy of the die base member 20 further preferably contains an additive of carbon (C), silicon (Si), chromium (Cr), manganese (Mn), molybdenum (Mo), platinum (Pt), palladium (Pd) or the like.

Moreover, another example of the alloy of the die base member 20 is a stainless steel alloy, and a specifically preferable example is SUS630 (C; 0.07 or less, Si; 1.00 or less, Mn; 1.00 or less, P; 0.040 or less, S: 0.030 or less, Ni; 3.00 to 5.00, Cr; 15.50 to 17.50, Cu; 3.00 to 5.00, Nb+Ta; 0.15 to 0.45, and Fe; balance (the unit is mass %)). Such a stainless alloy can comparatively easily be processed, and is an inexpensive material.

Moreover, as a further example of the alloy of the die base member 20, a tungsten carbide based hard metal which is excellent in wear resistance is preferably used. In consequence, it is possible to manufacture the honeycomb structure forming die 1 in which wear on the slits 5 is effectively prevented.

The above tungsten carbide based hard metal is an alloy containing at least tungsten carbide, and is preferably an alloy sintered with at least one metal selected from the group consisting of iron (Fe), cobalt (Co), nickel (Ni), titanium (Ti) and chromium (Cr). The tungsten carbide based hard metal using at least one metal selected from the above group as a binding agent is excellent especially in wear resistance or mechanical strength. Specific examples of the metal include a tungsten carbide based hard metal using cobalt (Co) as the binding agent and containing 0.1 to 50 mass % of WC—Co.

Figure 5A:
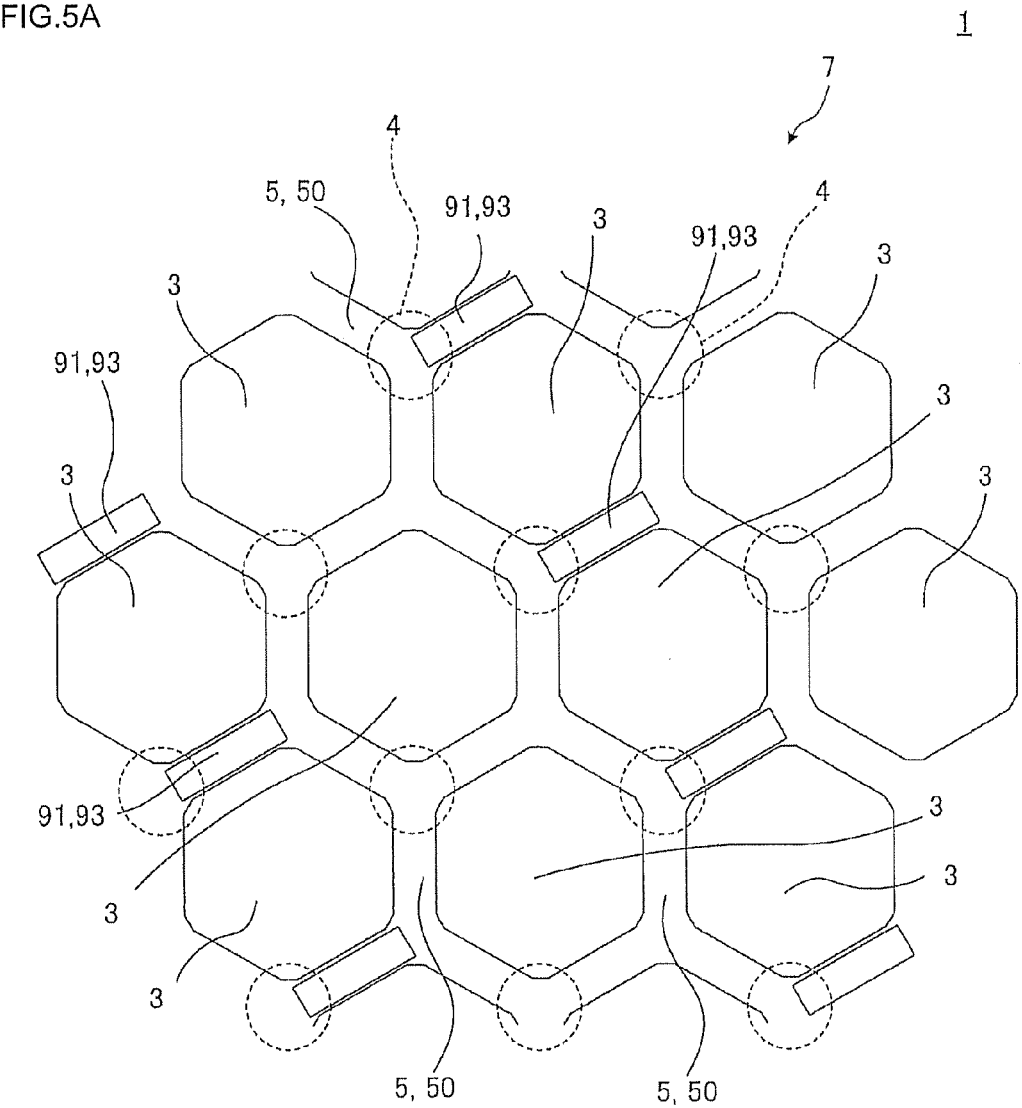
FIG. 5A is an explanatory view for explaining a first electric discharge processing process in the manufacturing method of the die for forming the honeycomb structure of the present invention.

(Introduction Hole Forming Process) First, the introduction holes 4 are formed in the thickness direction in one end faces as the clay supply face 8 of the die base member 20. Moreover, when the introduction holes 4 are formed in the die base member 20, as shown in FIG. 5A, the introduction holes are preferably formed at such positions as to be connected to the intersecting portions of the hexagonal honeycomb-like slits 5 of the honeycomb structure forming die 1. In a case where the introduction holes 4 are formed at such positions, when the extrusion-forming is performed by using the honeycomb structure forming die 1, the forming material introduced through the introduction holes 4 can uniformly be spread over the whole slits 5, and high shape retention can be realized. Moreover, as to the introduction holes 4, as shown in FIG. 5A, each introduction hole 4 is formed at the position corresponding to at least one vertex among six vertexes of the hexagonal shape of the hexagonal honeycomb-like honeycomb structure 100 to be extrusion-formed (see FIG. 3A) in the other end face of the die base member 20 (the backside of FIG. 5A).

The size of the opening diameter of the introduction hole 4 can appropriately be determined in accordance with the size of the honeycomb structure forming die 1 to be manufactured, the shape of the honeycomb structure 100 to be extrusion-formed (see FIG. 3A), and the size of the opening diameter of the introduction hole 4 is, for example, preferably from 0.7 to 1.8 times, further preferably 1.0 to 1.5 times the length of the opposite side of the hexagonal lattice-like partition region. There is not any special restriction on a method for forming the introduction holes 4, but a heretofore known method by electrochemical machining (ECM), electric discharge machining (EDM), laser processing, mechanical processing such as drilling or the like can preferably be used.

In the manufacturing method of the die for forming the honeycomb structure of the present invention, the first comb-teeth electrode is used in the first electric discharge processing process, and the second comb-teeth electrode is used in the second electric discharge processing process. Prior to the description of the first and second electric discharge processing processes, the first and second comb-teeth electrodes beforehand prepared will be described as follows.

(First Comb-Teeth Electrode)

Figure 4A:
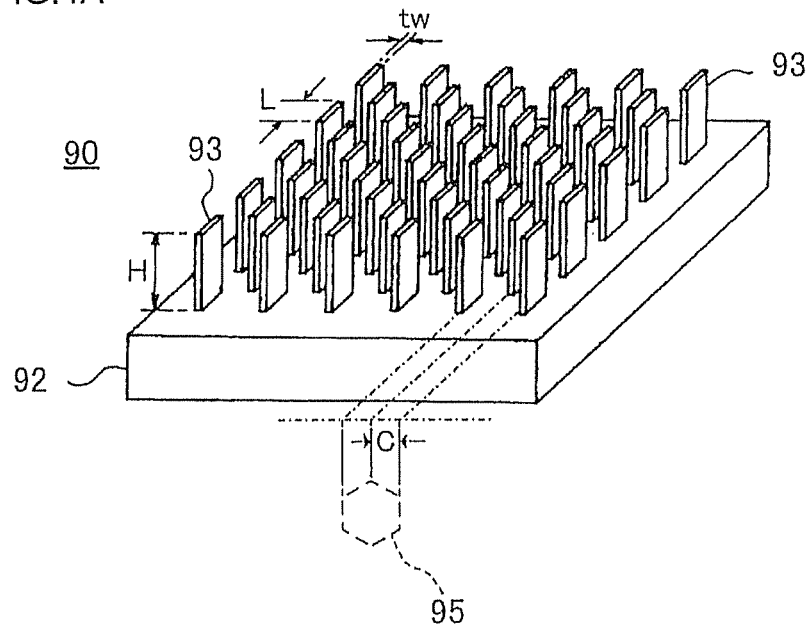
FIG. 4A is a perspective view schematically showing one example of a first comb-teeth electrode used in a manufacturing method of the die for forming the honeycomb structure of the present invention.
Figure 4B:
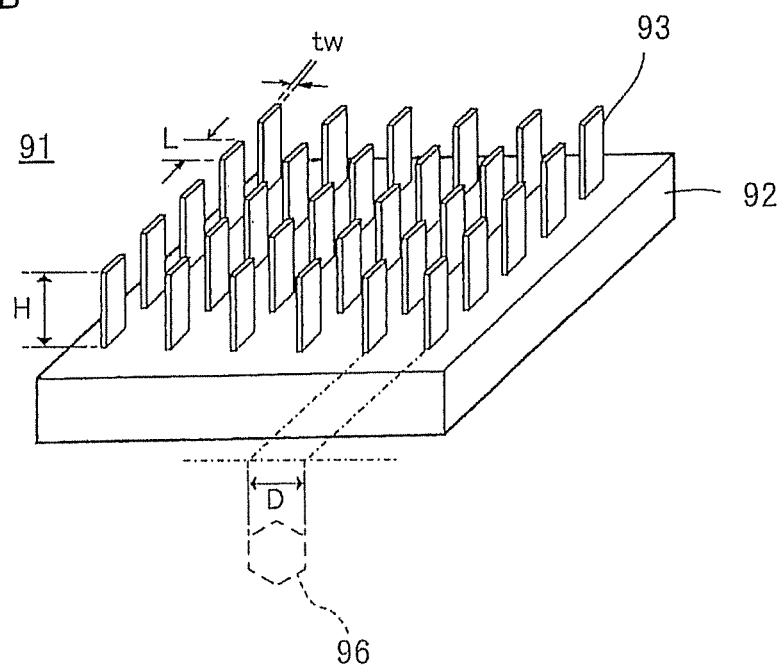
FIG. 4B is a perspective view schematically showing another example of the first comb-teeth electrode used in the manufacturing method of the die for forming the honeycomb structure of the present invention.

Two examples of the above first comb-teeth electrode in the honeycomb structure forming die having hexagonal lattice-like slits are shown in FIGS. 4A, 4B, respectively. By use of such a first comb-teeth electrode made of carbon graphite is used, electric discharge processing is performed while lowering slits of a hexagonal lattice-like cell die one by one, to form the slits 5 each having a slit width set to the predetermined width in positions where the inner peripheral slit 50 having the slit width set to the predetermined width and the outer peripheral slit are to be provided.

In the first electric discharge processing process, a first comb-teeth electrode 90 or 91 provided with a plurality of plate-like projection electrodes 93 corresponding to the groove widths of the slits 5 shown in FIG. 5A is used.

Moreover, as the first comb-teeth electrode used in the above first electric discharge processing process, the first comb-teeth electrode 90 or 91 is preferably used in which the plurality of plate-like projection electrodes 93 having dimensions corresponding to the widths of the slits 5 of the finally resultant desired honeycomb structure forming die 1 and having an arrangement as shown in FIGS. 4A, 4B are arranged in parallel with one another and vertically to a projection electrode support portion 92.

A thickness tw of each of the plurality of projection electrodes 93 provided in the comb-teeth electrode corresponds to the width of the inner peripheral slit 50, and is preferably from 0.020 to 0.800 mm. Moreover, a height H of the projection electrode 93 is larger than the depth of the inner peripheral slit 50, and is preferably from 1.00 to 8.00 mm. A width L of the projection electrode 93 is preferably from 0.40 to 2.00 mm.

In the first comb-teeth electrode 90 shown in FIG. 4A, the projection electrodes 93 are provided along all sides parallel to one set of sides among three sets of facing sides of each reference hexagonal shape 95. A distance between the projection electrodes 93 in a direction vertical to the plate-like faces of the projection electrodes is preferably a distance C which is a half of a distance between two facing sides of the reference hexagonal shape 95 as shown in FIG. 4A. The distance is preferably, for example, from 0.30 to 1.80 mm.

In the first comb-teeth electrode 91 shown in FIG. 4B, the projection electrodes 93 are provided along sides thereof parallel to one set of three sets of facing sides of a reference hexagonal shape 96 and only corresponding to the sides of the adjacent hexagonal shapes along one direction. The pitch of the projection electrodes 93 in the direction vertical to the plate-like faces thereof preferably corresponds to that of the cells of the desired honeycomb structure. Specifically, a distance between the projection electrodes 93 in the direction vertical to the plate-like faces is specifically equal to a distance D between two facing sides of the reference hexagonal shape 96 as shown in FIG. 4B. The distance is preferably, for example, from 0.60 to 3.60 mm. It is to be noted that the pitch of the projection electrodes 93 in the direction vertical to the plate-like faces thereof is a distance between the center lines of the plate-like faces of the facing projection electrodes 93. The pitch of the slits of the die becomes equal to that of the projection electrodes in the direction vertical to the plate-like faces thereof, but the pitch of the partition walls of the honeycomb structure obtained by forming and firing is a pitch obtained by multiplying the above die pitch by the contraction ratio of the material.

(Material of First Comb-Teeth Electrode)

There is not any special restriction on the material of the first comb-teeth electrode 90 or 91 used in the present embodiment, but examples of the material include a fine particle high-strength high-density carbon graphite material. More specific examples of the material preferably include a material having an average particle diameter of 5 μm or less. Carbon electrodes made of such a carbon graphite material have advantages that the projection electrodes 93 of the first comb-teeth electrode 90 or 91 having a fine shape or the like can precisely be formed and that the electrodes have a high hardness, an excellent wear resistance and a fast processing speed. However, the electrodes having the high hardness easily break down, and are hence required to be devised by performing the coarse slit processing as described in the above embodiment to beforehand omit a processing region or by efficiently removing sludge generated during the electric discharge processing with a processing solution or the like.

(Comb-Teeth Electrode Preparation Process)

A comb-teeth electrode preparation process is constituted of a first comb-teeth electrode preparation process of preparing the first comb-teeth electrode and a second comb-teeth electrode preparation process of preparing the second comb-teeth electrode.

(First Comb-Teeth Electrode Preparation Process)

The first comb-teeth electrode preparation process prepares the first comb-teeth electrode provided with the plurality of thin-plate-like first projection electrodes having dimensions corresponding to the sides constituting the inner peripheral slit, and the process can use a comb-teeth electrode used in the heretofore used electric discharge processing for forming hexagonal lattice-like slits such as Patent Document 1, Patent Document 2, Patent Document 3, and the like.

Hereinafter, the processes of the present embodiment will more specifically be described.

(First Electric Discharge Processing Process)

In the first electric discharge processing process, the other end face of the die base member as the clay forming face is subjected to electric discharge processing by use of the first comb-teeth electrode 90 or 91 shown in FIG. 4A or 4B, whereby the inner peripheral slit having the predetermined width is formed in the inner peripheral region, and a slit having a predetermined width equal to that of the inner peripheral slit is formed at a position where the outer peripheral slit is to be formed in the outer peripheral region. A slit having the predetermined width is similarly formed in the outermost peripheral region. In this way, the slit having the slit width equal to the predetermined width is preferably formed over the whole clay forming face. In the outer peripheral region, the width-enlarged portion is formed by the electric discharge processing by use of the second comb-teeth electrode after the first electric discharge processing, and this processing performs a function of coarse processing in this case. Moreover, the width-enlarged portion does not come in contact with any introduction hole sometimes, because the end of width enlarged portion has a predetermined depth from the clay forming face. In the case of such an outer peripheral slit, a portion to be connected to the introduction hole is connected to the introduction hole by the slit formed at a position where the outer peripheral slit is to be formed in this first electric discharge processing and having the predetermined width.

In the first electric discharge processing process, by use of the first comb-teeth electrode 90 in which a plurality of plate-like projection electrodes 93 parallel to one of the sides constituting the above hexagonal slit are arranged side by side on the projection electrode support portion 92, as shown in FIG. 4A, the clay forming face is preferably subjected to the first comb-teeth electrode electric discharge processing at least three times corresponding to three directions parallel to the sides of the reference hexagonal shape 95 which is the desired shape of the hexagonal lattice-like slit. Three kinds of first comb-teeth electrodes 90 each of which has the teeth electrode aligned in each direction independently may be prepared, or the same first comb-teeth electrode 90 may be rotated at an angle of 60°, respectively.

Moreover, in the first electric discharge processing process, by use of the first comb-teeth electrode 91 in which a space between the rows of the projection electrodes 93 is equal to the space D between the facing sides of the reference hexagonal shape 96 as shown in FIG. 4B, electric discharge processing is further preferably performed at least six times corresponding to the sides of the reference hexagonal shape 96 between the lattice-like partition regions 3 (see FIG. 5A) adjacent to each other along one of the three directions parallel to the sides of the reference hexagonal shape 96 by one time of electric discharge processing. As compared with a case where the first comb-teeth electrode 90 is used, by conducting electric discharge processing using the first comb-teeth electrode 91, the number of the times of the electric discharge processing becomes twofold, but the amount itself of the sludge generated during one time of electric discharge processing can be suppressed, and the speed of the one time of electric discharge processing can become threefold as compared with the above case where the first comb-teeth electrode 90 is used. In addition, the possibility of the breakdown of the first comb-teeth electrode 91 can further be suppressed. A plurality of first comb-teeth electrodes 91 each of which has the teeth electrode aligned in each direction independently may be prepared, or the same first comb-teeth electrode 91 may be rotated at an angle of 60°, respectively.

(Second Comb-Teeth Electrode)

Figure 6:
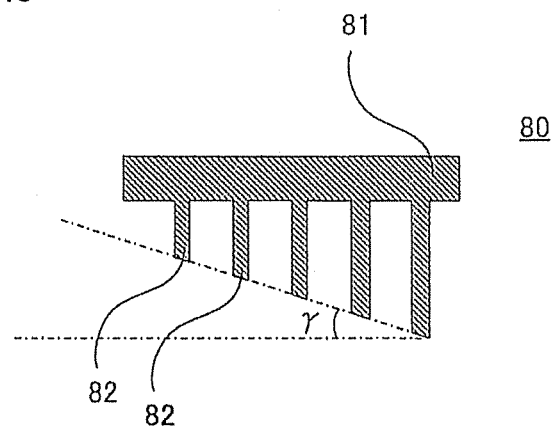
FIG. 6 is a partially enlarged sectional view schematically showing a second comb-teeth electrode used in the manufacturing method of the die for forming the honeycomb structure of the present invention.
Figure 7:
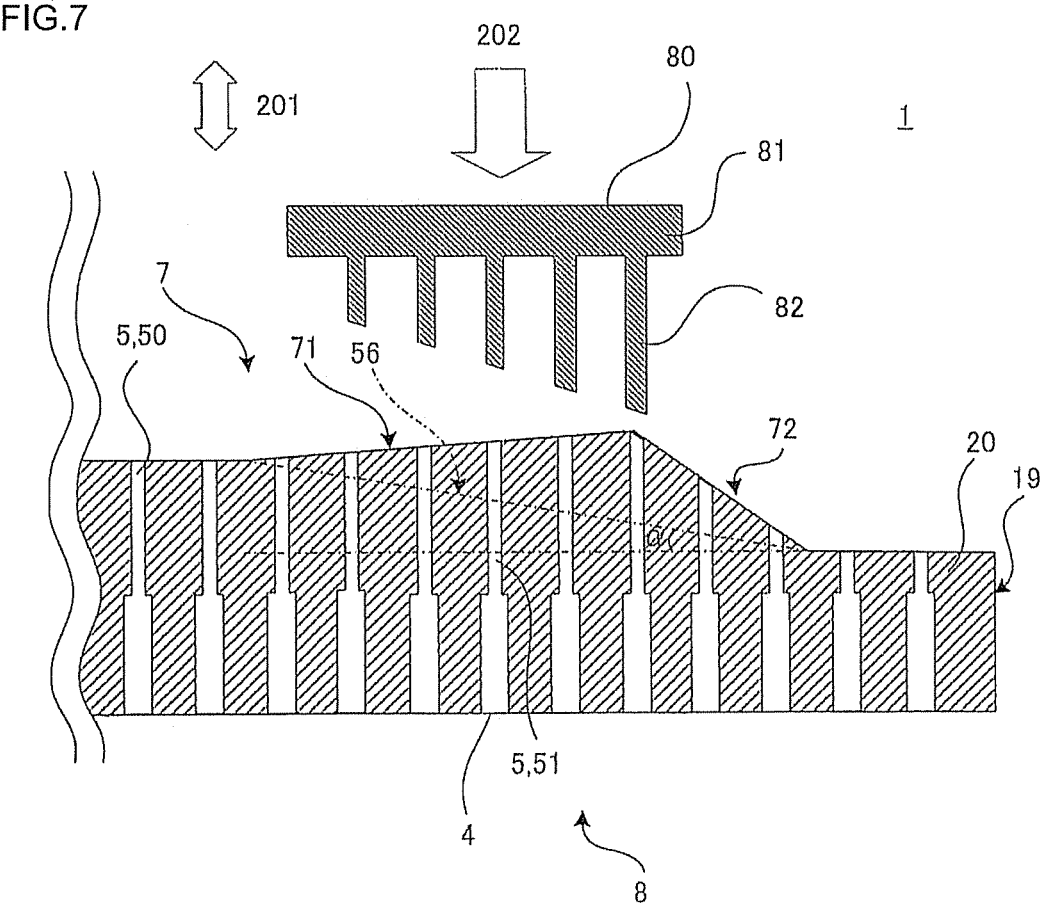
FIG. 7 is a partially enlarged sectional view schematically showing the second electric discharge processing process in the manufacturing method of the die for forming the honeycomb structure of the present invention.

FIG. 6 is a schematic sectional view schematically showing the second comb-teeth electrode. A plurality of second projecting portions corresponding to the shape of the width-enlarged portion is provided in parallel from a second comb-teeth electrode support portion 81.

Figure 8A:
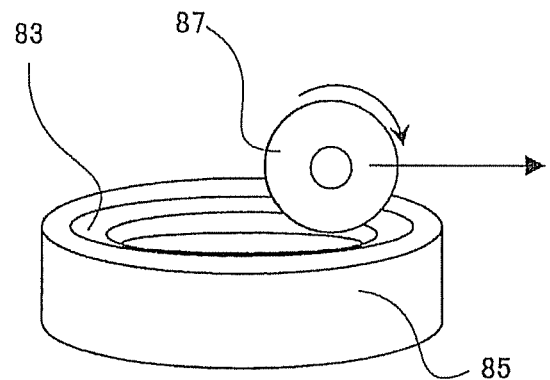
FIG. 8A is an explanatory view for explaining one example of a second comb-teeth electrode manufacturing process in the manufacturing method of the die for forming the honeycomb structure of the present invention.
Figure 8B:
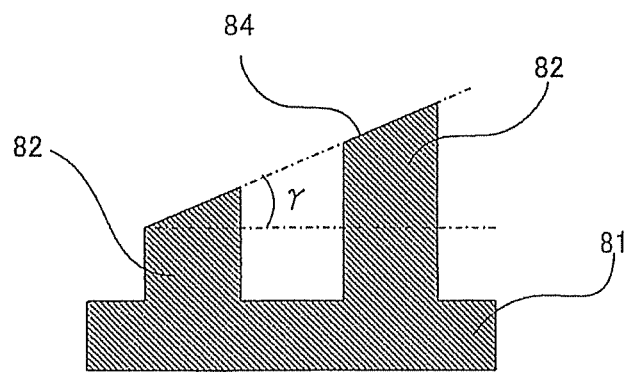
FIG. 8B is a partially enlarged sectional view of comb-teeth electrodes obtained in the embodiment of the second comb-teeth electrode manufacturing process in the manufacturing method of the die for forming the honeycomb structure of the present invention.
Figure 8C:
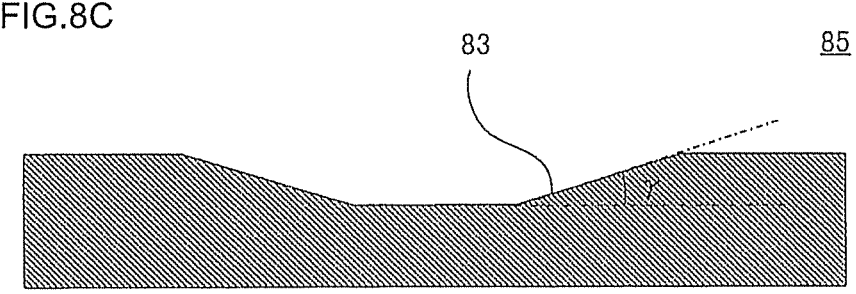
FIG. 8C is an enlarged sectional view showing a plate-like member having a mortar-like concave face and used in the embodiment of the second comb-teeth electrode manufacturing process in the manufacturing method of the die for forming the honeycomb structure of the present invention.

FIG. 8C is a schematic sectional view showing a state in which one end face of a plate-like second comb-teeth electrode base member is provided with a mortar-like concave face 83. This mortar-like concave faces has a slant angle γ. This angle is provided in accordance with the desired depth distribution of the width-enlarged portion as a processing target. In consequence, there is not any special restriction on the angle. That is, each angle γ formed at each end of the plate-like second comb-teeth electrode base member is not necessarily linearly constant each other, and there is no problem as long as the angle may be set in accordance with at least the predetermined depth distribution of the width-enlarged portion.

As shown in FIG. 1E, the respective ends 55 of the width-enlarged portions 52 are formed along the line 56 with the slant angle α. The second comb-teeth electrode forms the width-enlarged portion 52 by the electric discharge processing. A plurality of second comb-teeth electrode base members having mortar-like concave faces in accordance with the desired depth distribution of the width-enlarged portion as the processing target are beforehand prepared, whereby it is possible to prepare the die having the constant dimensional precision of the slit intersecting portions, constant surface roughness and high forming properties regardless of the slit shapes of complicated slits such as lattice-like slits having a pentangular shape or more polygonal shape except a hexagonal shape, slits having a combination thereof, and slits having large and small sizes and configured to partition the lattice-like partition regions.

That is, first, the second projection electrodes 82 partially corresponding to a gap between the width-enlarged portions are formed at positions of a mortar-like concave face 83 of the second comb-teeth electrode base member having this mortar-like concave face where the mortar-like concave face 83 corresponds to the width-enlarged portion 52 of the die base member.

At this time, it is considered that the slant angle γ of the tip of each projection electrode during the electric discharge processing decreases by the wear on the electrode. Therefore, the slant angle is preferably beforehand set to be larger than the angle α. α<γ is preferable. Example: when α=20° is set, the electric discharge processing is performed with γ=24°, whereby the desired angle α is obtained.

The shape of the mortar-like concave face may be determined by the calculation of the clay pressure loss, or the shape may be determined so as to smoothly vary toward the boundary. Moreover, the dimension of the mortar-like concave face may partially or entirely vary from the predetermined bottom shape of the width-enlarged portion in accordance with the wear on the electrode generated during the electric discharge processing. The rib width of the electric discharge electrode for processing the width-enlarged portion is varied stepwise or continuously in accordance with the predetermined slit width, to decrease a step between the width-enlarged portion (the outer peripheral region) and the ordinary portion (the inner peripheral region) in the die. The comb-teeth dimension of the electrode for processing the mortar-like width-enlarged portion is varied stepwise or continuously from the width-enlarged portion in the outer peripheral slit to the inner peripheral ordinary slit portion, to decrease a difference between the width-enlarged portion and the ordinary portion in the boundary.

(Material of Second Comb-Teeth Electrode)

There is not any special restriction on the material of the second comb-teeth electrode used in the present embodiment, but examples of the material include a copper tungsten alloy, a silver tungsten alloy, copper and carbon graphite. Preferable examples of carbon graphite more specifically include the fine particle high-strength high-density carbon graphite material having an average particle diameter of 5 μm or less. As a carbon electrode made of such a carbon graphite material, the first comb-teeth electrode has advantages that the projection electrodes 93 of the first comb-teeth electrode 90 or 91 having a fine shape or the like can precisely be formed and that the electrode has a high hardness, an excellent wear resistance and a fast processing speed.

(Second Comb-Teeth Electrode Preparation Process)

The second comb-teeth electrode preparation process beforehand prepares a plurality of plate-like second comb-teeth electrode base members each having a mortar-like concave face corresponding to the angle defined by the line 56 shown in FIG. 1C. FIG. 8C is a sectional view of a plate-like second comb-teeth electrode base member having mortar-like concave face 85 in the thickness direction 201. A reason for the preparation of the plurality of base members is that it is difficult to precisely prepare a minute electrode having such a shape as to complete the slit at once. The minute electrode used for processing a part of the slit, for example, each side constituting the slit or a plurality of portions parallel to the side constituting the slit is precisely prepared by the cutting or grinding.

The mortar-like concave face of each of the plate-like second comb-teeth electrode base members having mortar-like concave face 85 beforehand prepared is subjected to the cutting or grinding to form not portions corresponding to the respective parallel sides constituting the width-enlarged portion, thereby providing a plurality of thin-plate-like second projection electrodes 80 corresponding to the respective parallel sides constituting the width-enlarged portion. In consequence, a plurality of second comb-teeth electrodes corresponding to the respective parallel sides constituting the width-enlarged portion is prepared.

By the electric discharge processing performed by individually pressing the plurality of second comb-teeth electrodes obtained in this manner onto the clay forming face 7 of the die base member 20, parts of the width-enlarged portion 52 are formed one by one.

Moreover, after forming the slits 5 and the introduction holes 4 by the introduction hole forming process, the first electric discharge processing process and the second electric discharge processing process, this die base member may be coated by CVD or the like. Such coating can improve the wear resistance.

EXAMPLES

Hereinafter, the present invention will more specifically be described with respect to examples, but the present invention is not limited to the following examples.

Example 1

As Example 1, a honeycomb structure forming die having hexagonal lattice-like slits shown in FIG. 1F was manufactured. The width of an inner peripheral slit was set to a constant width, and the width of an outer peripheral slit was larger than that of the inner peripheral slit. Processes will be described later.

(Introduction Hole Forming Process)

In an introduction hole forming process, about 10,000 introduction holes 4 each having a diameter of 1.00 mm and a depth of 18.6 mm from a clay supply face were formed at positions corresponding to three alternate vertexes of each hexagonal shape constituting the hexagonal honeycomb shape of a honeycomb structure to be extrusion-formed in one end face of a die base member made of a stainless steel and having a diameter of 158.0 mm and a thickness of 21.0 mm by use of an electrochemical machining method.

(First Electric Discharge Processing Process)

In a first electric discharge processing process, a carbon graphite material was ground to form a first comb-teeth electrode as shown in FIG. 4B. By using the first comb-teeth electrode 91, electric discharge processing for forming slits 5 as shown in FIG. 5A was performed. Specifically, as plate-like projection electrodes 93 provided in the first comb-teeth electrode 91, there were used electrodes each having a thickness tw of 0.18 mm, a height H of 4.50 mm and a width L of 0.70 mm in a direction parallel to the first projection electrodes 93 as shown in FIG. 4B, and a distance D between the first projection electrodes was 1.20 mm and was equal to the distance between the two facing sides of the reference hexagonal shape 96 shown in FIG. 4B.

By use of the first comb-teeth electrode 91, electric discharge processing was performed by pressing the first projection electrodes 93 onto all portions of a clay forming face to be used for extrusion-forming in a processing solution for the electric discharge processing with a space being left from the other end face of a die base member 20. Consequently, an inner peripheral slit 50 having a slit width of 0.24 mm and a depth of 3.0 mm was formed, and a slit having an equal predetermined width of 0.24 mm was formed at a position where a silt having a width-enlarged portion was to be formed.

The comb-teeth electrodes 91 were rotated respectively at an angle of 60° to perform the electric discharge processing corresponding to the sides of a slit, and the electrode was similarly rotated respectively at angle of 60° to perform the electric discharge processing, thereby forming the slit having a predetermined width. In consequence, one end face of the die base member 20 was processed to such a depth as to communicate with the introduction holes 4, whereby slits 5 having a hexagonal honeycomb shape and lattice-like regions defined by the slits 5 were formed in the other end face of the die base member 20. The electric discharge processing of the present example was performed by using an NC electric discharge processor. The processing solution was discharged from the central side to an outer peripheral side by using a pump so as to set a pressurization pressure to 0.01 MPa.

(Second Electric Discharge Processing Process)

In a second electric discharge processing process, as the base material of a second comb-teeth electrode, a carbon graphite electrode material having a dimension (diameter) of 158.0 mm was cut, to form a second comb-teeth electrode base member having a mortar-like concave face as shown in FIG. 8C. The slant angle γ of this mortar-like concave face was set to 24°. Furthermore, this second comb-teeth electrode base member was ground to obtain the second comb-teeth electrode having a plurality of second projection electrodes 82 (the size of each projection electrode: a width of 0.21 mm, the predetermined width). The slant angle γ of the mortar-like concave face became the slant angle γ of the corresponding tip face of each second projection electrode as it was.

Figure 5B:
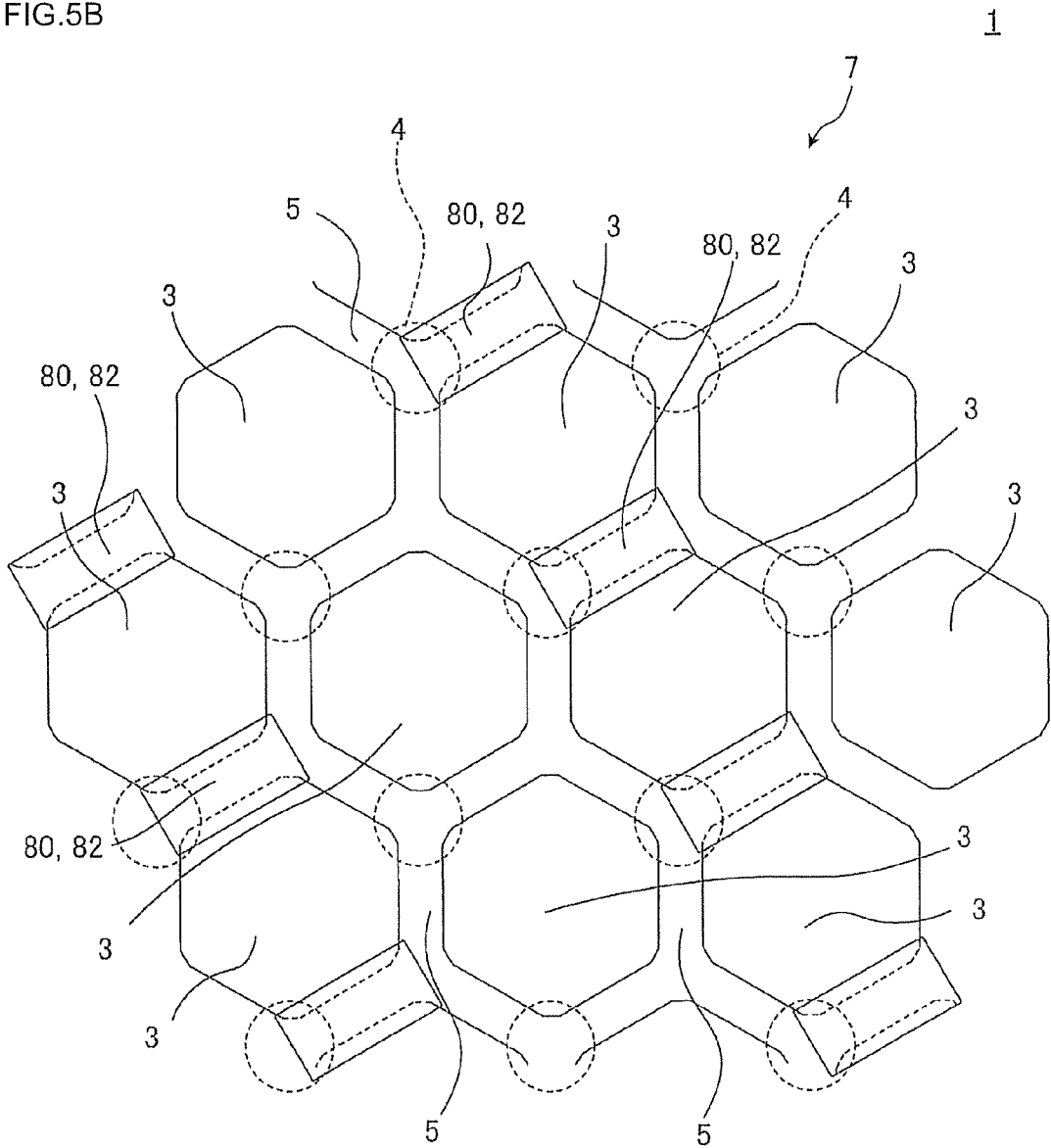
FIG. 5B is an explanatory view for explaining a second electric discharge processing process in the manufacturing method of the die for forming the honeycomb structure of the present invention.

In an outer peripheral region 24 of the clay forming face of the die base member 20, the second projection electrodes 82 were pressed so as to overlap with the slits subjected to the first electric discharge processing and having the predetermined width (a slit width of 0.27 mm) to perform electric discharge processing (see FIG. 5B). In consequence, the width-enlarged portions having an end with a slant angle α of 20° were formed one by one. In this way, the outer peripheral slit having the slit width enlarged to a constant width was obtained as shown in FIG. 1F.

(Formation of Slant Face of Outer Peripheral Region)

To form the slant face of the outer peripheral region of the clay forming face by providing an ascendently thickened area toward the outer peripheral side of the outer peripheral region, counter boring of an inner peripheral region in a depth of 0.50 mm was performed. A carbon graphite electrode material was cut to prepare a counter-bored electrode formed into a convex shape. By the electric discharge processing performed by pressing the counter-bored electrode having this convex shape onto the clay forming face of the die base member, a flat face having a depth of 0.50 mm was formed in the inner peripheral region, and a counter bore having the slant face of the outer peripheral region was formed in the outer peripheral region. That is, the inner peripheral region of the clay forming face was flattened to form a concave flat portion. The counter-boring was further performed through electric discharge processing by pressing the counter-bored electrode having the convex shape onto the clay forming face of the die base member, to form the slant face of the outer peripheral region into a concave slant face.

(Formation of Slant Face of Outermost Peripheral Region)

The slant face of the outermost peripheral region 72 shown in FIG. 1C was formed by providing an area descendently thinned toward the outside in the outermost peripheral region 26. The slant angle thereof was set to 45°. The slant face of the outermost peripheral region 72 was formed in the outermost peripheral region 26 by the electric discharge processing by use of a graphite electrode with a slant angle of 45°.

A second comb-teeth electrode for processing width-enlarged portion was manufactured. The angle of the tip of each projection electrode of the second comb-teeth electrode for processing the width-enlarged portion was 24°, but owing to wear on the electrode, the end of width-enlarged portion positioned on the line 56 having a desired slant angle of 20° was formed. Moreover, any grinding difference did not occur in the reaching depth of the width-enlarged portion of each slit intersecting portion.

Example 2

As Example 2, a honeycomb structure forming die having hexagonal lattice-like slits shown in FIG. 1G was manufactured. Processes will be described later.

(Introduction Hole Forming Process)

In an introduction hole forming process, about 10,000 introduction holes each having a diameter of 1.00 mm were formed in a depth of 18.6 mm from a clay supply face at positions corresponding to three alternate vertexes of each hexagonal shape constituting the hexagonal honeycomb shape of a honeycomb structure to be extrusion-formed in one end face of a die base member made of a stainless steel and having a diameter of 158.0 mm and a thickness of 21.0 mm by use of an electrochemical machining method.

(First Electric Discharge Processing Process)

By using a first comb-teeth electrode, an inner peripheral slit was formed, and a slit having a predetermined width equal to that of the inner peripheral slit was formed at a position where an outer peripheral slit was to be formed. The shape and dimension of the first comb-teeth electrode and a first electric discharge processing process were similar to those of Example 1. A carbon graphite material was ground to form a comb-teeth0like electrode (a comb tooth size: a width of 0.18 mm×a height of 4.50 mm). The sides of the hexagonal slits having a width of 0.24 mm and a depth of 3.00 mm were formed one by one in all of the predetermined range of the die base member used for the extrusion-forming by the electric discharge processing by use of this electrode.

(Second Electric Discharge Processing Process)

Figure 9A:
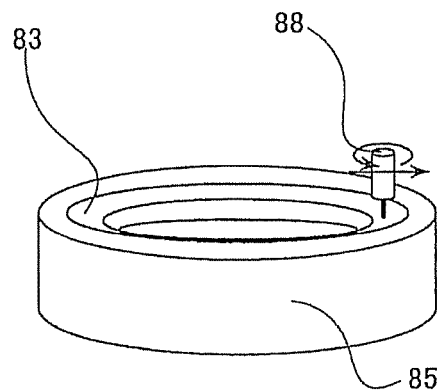
FIG. 9A is an explanatory view for explaining another embodiment of the second comb-teeth electrode manufacturing process in the manufacturing method of the die for forming the honeycomb structure of the present invention.
Figure 9B:
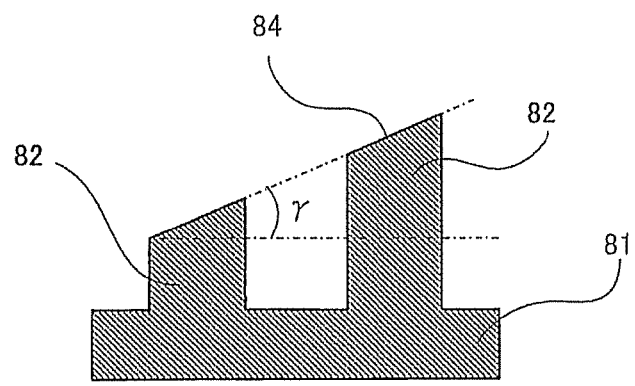
FIG. 9B is a partially enlarged sectional view of comb-teeth electrodes obtained in the embodiment of the second comb-teeth electrode manufacturing process in the manufacturing method of the die for forming the honeycomb structure of the present invention.

In a second electric discharge processing process, as the base material of a second comb-teeth electrode, a carbon graphite electrode material having a dimension (diameter) of 158.0 mm was cut, to form a second comb-teeth electrode base member having a mortar-like concave face 85 as shown in FIG. 8C. The slant angle γ of this mortar-like concave face was set to 24°. As shown in FIG. 9A, this second comb-teeth electrode base member was ground with an end mill to obtain the second comb-teeth electrode having a plurality of second projection electrodes (the size of each projection electrode: a width of 0.185 to 0.235 mm, the width was varied as much as 0.005 mm per pitch). The slant angle γ of the mortar-like concave face became the slant angle γ of the tip of each second projection electrode as it was. The pitches of these second projection electrodes were varied, whereby the slit width of the outer peripheral slit was varied every pitch as shown in FIG. 1G.

The second projection electrode was pressed onto an outer peripheral region 24 of a clay forming face of a die base member 20 so as to overlap with the slit subjected to first electric discharge processing and having a predetermined width (a slit width of 0.27 mm), thereby performed electric discharge processing. In consequence, a plural number of width-enlarged portions having a slant end with a slant angle α of 20° was formed on each side.

(Formation of Slant Face of Outer Peripheral Region)

To obtain the slant face of the outer peripheral region of the clay forming face, counter boring of the inner peripheral region in a depth of 0.50 mm was performed. The carbon graphite electrode material was cut to prepare a counter-bored electrode formed into a convex shape. By the electric discharge processing performed by pressing the counter-bored electrode having this convex shape onto the clay forming face of the die base member, a flat face having a depth of 0.50 mm was formed in the inner peripheral region, and a counter bore having the slant face of the outer peripheral region was formed in the outer peripheral region. That is, the inner peripheral region of the clay forming face was flattened to form a concave flat portion. The counter-boring was further performed through electric discharge processing by pressing the counter-bored electrode having the convex shape onto the clay forming face of the die base member, to form the slant face of the outermost peripheral region 72 into a concavely slant face.

(Formation of Slant Face of Outermost Peripheral Region)

The slant face of the outermost peripheral region shown in FIG. 1C was formed by providing an area 72 descendently thinned toward the outside in the outermost peripheral region 26. The slant angle was set to 45°. The slant face of the outermost peripheral region 72 was formed in a portion of the outermost peripheral region 26 by the electric discharge processing by use of a graphite electrode with a slant angle of 45°.

A second comb-teeth electrode for processing width-enlarged portions was manufactured. The angle of the tip of each projection electrode of the second comb-teeth electrode for processing the width-enlarged portion was 24°, but owing to wear on the electrode, the end of the width-enlarged portion positioned on the line 56 had a desired slant angle of 20°. Moreover, any grinding difference did not occur in the depth of the width-enlarged portion of each slit intersecting portion.

The width of the comb-teeth electrode for processing the width-enlarged portion was increased as much as 0.005 mm/pitch from the boundary to the outer peripheral portion, but owing to the wear on the electrode, the slit width of the die could be increased as much as a predetermined width of 0.003 mm/pitch. Moreover, the angle of the tip of the comb-teeth electrode was set to be larger than a predetermined depth angle in the same manner as in Example 1, whereby a predetermined depth angle could be obtained.

Hereinafter, there will be described the results of the measurements of the surface roughness of each of the die base member, the slant face of the outer peripheral region obtained by the electric discharge processing, the inner peripheral slit formed by the first electric discharge processing by use of the first comb-teeth electrode, the outer peripheral slit (the width-enlarged portion) formed by the second electric discharge processing by use of the second comb-teeth electrode and the introduction holes formed by the electrochemical processing in Examples 1 and 2.

Results of Example 1

Die base member: 0.75 μm (Ra), the slant face of the outer peripheral region: 0.72 μm (Ra), the inner peripheral slit: 0.78 μm (Ra), the outer peripheral slit (the width-enlarged portion): 0.78 μm (Ra), the slant face of the outermost peripheral region: 0.80 μm (Ra), and the introduction hole: 0.32 μm (Ra).

Results of Example 2

Die base member: 0.78 μm (Ra), the slant face of the outer peripheral region: 0.72 μm (Ra), the inner peripheral slit: 0.78 μm (Ra), the outer peripheral slit (the width-enlarged portion): 0.78 μm (Ra), the slant face of the outermost peripheral region: 0.80 μm (Ra), and the introduction hole: 0.32 μm (Ra).

In this way, the electric discharge processing was performed to obtain the equal surface roughness of each contact portion between the slits and clay during the extrusion-forming, which enabled the improvement of the precision of the adjustment function of the clay pressure loss by the width-enlarged portion and the suppression of the forming defect.

Moreover, the electric discharge processing was similarly used to process all the slits, whereby the fluctuation of the dimensional precision in the intersecting portions of the slits was 100 μm or less.

According to the die for forming the honeycomb structure and the manufacturing method of the die of the present invention, the honeycomb structure including pentangular or more polygonal cells or cells having large and small sizes can be manufactured with higher dimensional precision and strength.

DESCRIPTION OF REFERENCE NUMERALS

1: honeycomb structure forming die, 2a: outer peripheral cell, 2b: inner peripheral cell, 2d: boundary between inner peripheral side and outer peripheral side, 3: lattice-like partition region, 4: introduction hole, 5: slit, 6: hexagonal shape, 7: clay forming face, 8: clay supply face, 10: spacer, 11: pressing plate, 12: back spacer, 13: back pressing plate, 19: outer peripheral portion of die base member, 20: die base member, 22: inner peripheral region, 24: outer peripheral region, 26:

outermost peripheral region, 27: starting position of slant face of the outermost peripheral region at outermost peripheral region, 28: outer peripheral side of outer peripheral region, 29: boundary between inner peripheral region and outer peripheral region, 30: lattice-like partition region of inner peripheral region, 31: lattice-like partition region of outer peripheral region, 33: lattice-like partition region of slant face of outermost periphery, 34: lattice-like partition region of flat face of outermost periphery, 40: honeycomb structure, 41: partition wall, 41a: outer peripheral partition wall, 41b: inner peripheral partition wall, 42: cell, 50: inner peripheral slit, 51: outer peripheral slit, 52: width-enlarged portion, 53: slit of outermost peripheral slant face, 54: slit of outermost peripheral flat face, 55: end of width enlarged portions, 56: line drawn by connecting the slant ends of width-enlarged portions with a straight line, 61: formed honeycomb article, 71: slant face of outer peripheral region, 72: slant face of outermost peripheral region, 80: second projection electrode, 81: support portion of second comb-teeth electrode, 82: second projection electrode, 83: mortar-like concave face, 84: slant face of tip of second projection electrode, 85: second comb-teeth electrode base member having mortar-like concave face, 87: grinding jig, 88: end mill, 90: first comb-teeth electrode, 91: first comb-teeth electrode, 92: projection electrode support portion, 93: projection electrode, 95: reference hexagonal shape, 96: dimension of lattice-like partition region, 100: honeycomb structure, 101: formed honeycomb article, 130: forming defect, 200: extruding direction, and 201: thickness direction of die base member.

What is claimed is:

1. A die for forming a honeycomb structure, comprising:
    in one end face of a plate-like die base member, a clay supply face provided with a plurality of introduction holes through which a clay made of a ceramic forming material is introduced; and
    in the other end face of the die base member, a clay forming face provided with lattice-like slits having been connected to the introduction holes in the die base member, and through which the clay is extruded to form a formed honeycomb article,
    at least a part of a plurality of lattice-like partition regions defined by the slits in the clay forming face being provided in such a position that the extended line of said at least part of a plurality of lattice-like regions overlap with the slits at the edges thereof in a plane seen from a thickness direction of the die base member,
    the slits including an inner peripheral slit formed in an inner peripheral region of the clay forming face and having a slit width set to a predetermined width, and an outer peripheral slit formed in an outer peripheral region which surrounds the periphery of the inner peripheral region of the clay forming face and having a width-enlarged portion in the slit which has a width larger than that of the inner peripheral slit,
    wherein the width of the width-enlarged portion of the outer peripheral slit becomes narrow so as to be equal to the predetermined width of the slit in the inner peripheral region at the end of the width-enlarged portion on the side of the clay supply face, and a reaching depth of the end of the formed slit having a width-enlarged portion gradually increases, starting from the boundary between the inner peripheral region and the outer peripheral region toward the outer peripheral side of the die base member.

2. The die for forming the honeycomb structure according to claim 1, wherein the slit width of the outer peripheral slit at the width-enlarged portion gradually increases starting from a boundary between the inner peripheral region and the outer peripheral region toward the outer peripheral side of the die base member.

3. The die for forming the honeycomb structure according to claim 2, wherein the slit width of the outer peripheral slit at the width-enlarged portion increases at a constant rate per pitch of the lattice-like partition regions starting from the boundary between the inner peripheral region and the outer peripheral region toward the outer peripheral side of the die base member.

4. The die for forming the honeycomb structure according to claim 1, wherein every end of width-enlarged portions of the slits is aligned so as to be positioned along a slope formed when said every end is connected by a straight line by making the ends deepened one by one in the thickness direction of the die base member, starting from the boundary between the inner peripheral region and the outer peripheral region toward the outer peripheral side of the die base member.

5. The die for forming the honeycomb structure according to claim 2, wherein every end of width-enlarged portions of the slits is aligned so as to be positioned along a slope formed when said every end is connected by a straight line by making the ends deepened one by one in the thickness direction of the die base member, starting from the boundary between the inner peripheral region and the outer peripheral region toward the outer peripheral side of the die base member.

6. The die for forming the honeycomb structure according to claim 3, wherein every end of width-enlarged portions of the slits is aligned so as to be positioned along a slope formed when said every end is connected by a straight line by making the ends deepened one by one in the thickness direction of the die base member, starting from the boundary between the inner peripheral region and the outer peripheral region toward the outer peripheral side of the die base member.

7. The die for forming the honeycomb structure according to claim 1, wherein a thickness of at least a part of the outer peripheral region becomes thicker so as to form an ascendently thickened area in the outer peripheral portion in the thickness direction of the die base member starting from the boundary between the inner peripheral region and the outer peripheral region toward the outer peripheral side of the die base member.

8. The die for forming the honeycomb structure according to claim 1, wherein every slit inclusive of the width-enlarged portion has a surface roughness (Ra) variance of 1 μm or less.

9. The die for forming the honeycomb structure according to claim 1, wherein the width-enlarged portions of the outer peripheral slits at intersecting portions of the slits have a fluctuation in depth precision of 100 μm or less.

10. A manufacturing method of the die for forming the honeycomb structure according to claim 1, comprising:
    a step of forming a plurality of introduction holes in one end face as a clay supply face of a die base member; a step of forming slits having a predetermined width including inner peripheral slits by subjecting another end face as a clay forming face of the die base member to a first electric discharging treatment with pressing a first comb-teeth electrode provided with a plurality of thin-plate-like first projection electrodes having dimensions corresponding to sides constituting the inner peripheral slits onto the other face; and, after the first electric discharging,
    a step of forming slits having width-enlarged portion by subjecting a part of silts having a predetermined width formed in a peripheral portion in the clay forming surface to a second electric discharging treatment with pressing a second comb-teeth electrode provided with thin-plate-like second projection electrodes provided at positions corresponding to respective slits in the peripheral portion so as to make the electrodes faced in parallel with both sides of respective slits and having a tip structure to form slits having width-enlarged portions in such a predetermined shape that ends opposite to the clay forming face form a slope when the respective ends are connected with a straight line.

11. A manufacturing method of the die for forming the honeycomb structure according to claim 10, the second electric discharging treatment to form a width-enlarged portion is carried out one by one.

12. A manufacturing method of the die for forming the honeycomb structure according to claim 10, wherein a coating by CDV is carried out onto the whole surface inclusive of surfaces of slits and width-enlarged portions of a resultant processed die base member die after the completion of the second electric discharge processing process.

* * * * *